United States Patent
Seo et al.

(10) Patent No.: US 10,206,205 B2
(45) Date of Patent: Feb. 12, 2019

(54) METHOD FOR ALLOCATING BACKHAUL LINK RESOURCES IN RELAY COMMUNICATION SYSTEM, AND METHOD AND APPARATUS FOR TRANSMITTING AND RECEIVING DATA USING SAME

(71) Applicant: LG ELECTRONICS INC., Seoul (KR)

(72) Inventors: Han-Byul Seo, Anyang (KR); Byoung-Hoon Kim, Anyang (KR); Ki-Jun Kim, Anyang (KR); Hak-Seong Kim, Anyang (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/099,353

(22) Filed: Apr. 14, 2016

(65) Prior Publication Data

US 2016/0234811 A1 Aug. 11, 2016

Related U.S. Application Data

(63) Continuation of application No. 14/603,015, filed on Jan. 22, 2015, now Pat. No. 9,338,776, which is a
(Continued)

(51) Int. Cl.
*H04W 72/04* (2009.01)
*H04W 16/26* (2009.01)
(Continued)

(52) U.S. Cl.
CPC ...... *H04W 72/042* (2013.01); *H04B 7/15528* (2013.01); *H04L 5/0007* (2013.01);
(Continued)

(58) Field of Classification Search
CPC ............ H04B 7/2606; H04B 7/155442; H04L 5/0037; H04L 1/0001; H04W 28/00; H04W 4/06; H04W 16/26; H04W 72/1289
(Continued)

(56) References Cited

U.S. PATENT DOCUMENTS 5,550,811 A * 8/1996 Kaku ................. H04B 1/70753
370/342
8,228,841 B2 7/2012 Jung et al.
(Continued)

FOREIGN PATENT DOCUMENTS

JP 2008-167413 A 7/2008
JP 2010-504712 A 2/2010
(Continued)

OTHER PUBLICATIONS

Nortel Networks (Control Channel and Data Channel Design for Relay Link in LTE-Advanced), Jan. 16, 2009, 17 pages.*
(Continued)

*Primary Examiner* — Jae Y Lee
*Assistant Examiner* — Jean F Voltaire
(74) *Attorney, Agent, or Firm* — Birch, Stewart, Kolasch & Birch, LLP

(57) ABSTRACT

A method is provided for transmitting a downlink signal by a base station in a wireless communication system. A configuration of orthogonal frequency division multiplexing (OFDM) symbols is transmitted for a first partition of a subframe through higher layer signaling, and a Relay-Physical Downlink Control Channel (R-PDCCH) contained in at least the first partition of the subframe is also transmitted. If the R-PDCCH contains a downlink assignment, the first partition of the subframe is configured not to be used
(Continued)

for a transmission of a Physical Downlink Shared Channel (PDSCH) corresponding the R-PDCCH.

6 Claims, 22 Drawing Sheets

Related U.S. Application Data continuation of application No. 13/148,069, filed as application No. PCT/KR2010/000795 on Feb. 9, 2010, now Pat. No. 8,964,626.

(60) Provisional application No. 61/182,078, filed on May 28, 2009, provisional application No. 61/151,147, filed on Feb. 9, 2009.

(51) Int. Cl.
| | |
|---|---|
| *H04L 5/00* | (2006.01) |
| *H04W 4/06* | (2009.01) |
| *H04B 7/155* | (2006.01) |
| *H04L 27/26* | (2006.01) |
| *H04W 28/00* | (2009.01) |
| *H04B 7/26* | (2006.01) |
| *H04W 84/04* | (2009.01) |

(52) U.S. Cl.
CPC .......... *H04L 5/0037* (2013.01); *H04L 5/0053* (2013.01); *H04L 27/2602* (2013.01); *H04W 4/06* (2013.01); *H04W 16/26* (2013.01); *H04B 7/2606* (2013.01); *H04W 28/00* (2013.01); *H04W 72/0453* (2013.01); *H04W 84/047* (2013.01)

(58) Field of Classification Search
USPC .......................................... 370/252, 329–332
See application file for complete search history.

(56) References Cited

U.S. PATENT DOCUMENTS

| | | | |
|---|---|---|---|
| 8,265,566 B2 | 9/2012 | Golitschek | |
| 2007/0081483 A1 | 4/2007 | Jang et al. | |
| 2009/0059850 A1* | 3/2009 | Jung ................ | H04W 72/1289 370/329 |
| 2009/0268624 A1* | 10/2009 | Imamura ............... | H04W 48/08 370/252 |
| 2009/0270108 A1* | 10/2009 | Xu ........................ | H04W 24/10 455/452.2 |
| 2010/0080166 A1* | 4/2010 | Palanki ................ | H04B 7/2606 370/315 |
| 2010/0085927 A1 | 4/2010 | Torsner et al. | |
| 2010/0157927 A1 | 6/2010 | Mochizuki et al. | |
| 2010/0275083 A1* | 10/2010 | Nam .................. | H03M 13/6306 714/748 |
| 2010/0281323 A1* | 11/2010 | Wang ................. | H04B 7/15507 714/748 |
| 2011/0294530 A1* | 12/2011 | Malladi ................ | H04W 52/08 455/509 |

FOREIGN PATENT DOCUMENTS

| | | |
|---|---|---|
| JP | 2010-522467 A | 7/2010 |
| JP | 2012-509017 A | 4/2017 |
| KR | 10-2008-0020243 A | 3/2008 |
| WO | WO 2008/084693 A1 | 7/2008 |
| WO | WO 2008/115020 A1 | 9/2008 |
| WO | WO 2009/001594 A1 | 12/2008 |
| WO | WO 2010/056485 A1 | 5/2010 |

OTHER PUBLICATIONS

Huawei (Further Discussions on the Downlink Coordinated Transmission-Impact on the Radio Interface, dated Jan. 12-16, 2009).*
Huawei (Further Discussions on the Downlink Coordinated Transmission-Impact on the Radio Interface, dated Jan. 12-16, 2009), 8 pages.*
Nortel (Control Channel and Data Channel Design for Relay Link in LTE-A, dated Jan. 12-16, 2009), 17 pages.*
Huawei (Further Discussions on the Downlink Coordinated Transmission-Impact on the Radio Interface) (Year: 2009).*
Nortel (Control Channel and Data Channel Design for Relay Link in LTE-A) (Year: 2009).*
LG Electronics, "Resource Allocation and Downlink Control Channel Structure for Relay Backhaul Link", 3GPP TSG RAN WG1 Meeting #56bis, R1-091194, Mar. 23-27, 2009, 7 pages.
Nortel Networks, "Control Channel and Data Channel Design for Relay Link in LTE-Advanced," TSG-RAN1 #55bis, R1-090153, Agenda Item 12.6, Ljubljana, Slovenia, Jan. 12-16, 2009, 17 pages.
Texas Instruments, "Decode and Forward Relays for E-UTRA enhancements", 3GPP TSG RAN WGI #55, RI-084446, Nov. 10-14, 2008, Prague, Czech Republic, pp. 1-5.
Research in Motion et al., "Relay Link Control Signalling," 3GPP TSG RAN WG1 Meeting #57, R1-091783, San Francisco, USA, May 4-8, 2009, pp. 1-4.
Samsung, "Discussion on Backhaul Control Design for Type-I L3 Relay," 3GPP TSG RAN WG1 Meeting #57, R1-091871, San Francisco, USA, May 4-8, 2009, pp. 1-5.
Samsung, "L1 Relay Design and Operations," 3GPP TSG RAN WG1 #55bis, R1-090108, Ljubljana, Slovenia, Jan. 12-16, 2009, pp. 1-3.
LG Electronics, "Consideration on Resource Allocation for Relay Backhaul Link," 3GPP TSG RAN WG1 Meeting #56, R1-090790, Athens, Greece, Feb. 9-13, 2009, 5 pages.
Nortel, "Control Channel and Data Channel Design for Relay Link in LTE-Advanced," 3GPP TSG-RAN Working Group 1 Meeting #56, R1-090753, Athens, Greece, Feb. 9-13, 2009, 9 pages.
ZTE, "Control Signaling Structures for Relay Link," TSG-RAN WG1 #56, R1-090641, Athens, Greece, Feb. 9-13, 2009, pp. 1-3.
Nortel Networks, "Control Channel Design for the Support of Wider Bandwidth for LTE-Advanced", TSG-RAN1 #55bis, R1-090157, Ljubljana, Slovenia, Jan. 12-16, 2009, pp. 1-9 (10 pages total).
U.S. Appl. No. 14/603,015, filed Jan. 22, 2015.

* cited by examiner

METHOD FOR ALLOCATING BACKHAUL LINK RESOURCES IN RELAY COMMUNICATION SYSTEM, AND METHOD AND APPARATUS FOR TRANSMITTING AND RECEIVING DATA USING SAME

CROSS-REFERENCE TO RELATED APPLICATIONS

This application is a continuation of U.S. patent application Ser. No. 14/603,015 filed on Jan. 22, 2015 (now U.S. Pat. No. 9,338,776 issued on May 10, 2016), which is a continuation of U.S. patent application Ser. No. 13/148,069 (now U.S. Pat. No. 8,964,626 issued on Feb. 24, 2015), filed on Aug. 5, 2011, which is the National Phase of PCT International Application No. PCT/KR2010/000795 filed on Feb. 9, 2010, and which claims the benefit under 35 U.S.C. § 119(e) to U.S. Provisional Application Nos. 61/182,078 filed on May 28, 2009 and 61/151,147 filed on Feb. 9, 2009, all of which are hereby expressly incorporated by reference into the present application.

BACKGROUND OF THE INVENTION

The present invention relates to a method and apparatus for transmitting and receiving data in a relay communication system, and more particularly, to a method and apparatus for transmitting and receiving data capable of allocating resources by dividing backhaul link resources into plural partitions.

According to a recent trend, a communication system has an increased service frequency band, and cells having decreased radiuses for high speed communications and increased telephone traffic. This may cause many problems when applying the existing centralized cellular radio network method as it is. More concretely, a configuration of a radio link has a degraded flexibility due to a fixed location of a base station. This may cause difficulty in providing efficient communication services in a radio environment where traffic distribution or requested telephone traffic are severely changed.

In order to solve these problems, has been proposed a Multi-Hop relay system. This multi-hop relay system has the following advantages. Firstly, a cell service area may be increased by covering partial shadow areas occurring inside a cell area, and a system capacity may be increased. Furthermore, an initial situation requiring less service is implemented by using a relay. This may reduce the initial installation costs.

FIG. 1 is a view schematically illustrating a relay communication system.

A base station 101 forms a channel link with terminals 105 and 107. Here, the base station 101 may directly form a channel with the terminal 105 through a link 121, or may form a channel with the terminal 107 through a relay 103. A downlink channel 123 formed from the base station 101 to the relay 103 is called a backhaul link. The backhaul link 123 includes Relay-Physical Downlink Shared Channel (R-PDSCH) through which data is transferred from the base station 101 to the relay 103, and Relay-Physical Downlink Control Channel (R-PDCCH) through which control information is transferred.

In a sub-frame where the base station performs a downlink backhaul to the relay, control information and backhaul data of the relay have to be transferred. This may cause a difficulty in transmitting and receiving the control information and the backhaul data together with a downlink link sub-frame between the base station and a terminal. Furthermore, there is a limitation in controlling resource allocation according to a traffic amount of downlink backhaul data.

SUMMARY OF THE INVENTION

Therefore, an object of the present invention is to provide a method for allocating backhaul link resources capable of enhancing frequency selectivity and controlling resources according to a traffic amount by dynamically performing a scheduling for resource allocation by a base station over a backhaul channel.

Another object of the present invention is to provide a method for allocating backhaul link resources capable of implementing co-existence of a backhaul link sub-frame between a base station and a relay, with a downlink sub-frame between the base station and a terminal.

Still another object of the present invention is to provide a method for allocating backhaul link resources capable of preventing time delay occurring when a relay decodes backhaul link data, and a method for transmitting and receiving backhaul link data using the same.

To achieve these and other advantages and in accordance with the purpose of the present invention, as embodied and broadly described herein, there is provided a method for transmitting data in a method for transmitting and receiving data in a relay communication system, the method comprising: allocating a certain number of initial orthogonal frequency division multiplexing (OFDM) symbol transmission periods in a sub-frame of a downlink channel to a control channel that transfers control information of a terminal, wherein data is transmitted from a base station to a relay or a terminal through the downlink channel; dividing resource blocks excluded from the control channel of the sub-frame into at least two partitions in a frequency domain; determining whether or not each divided partition is allocated to the relay or the terminal as resources; and allocating data to the determined partition in order to transmit the partition to the relay or the terminal through the downlink channel, wherein the partition determined for the allocation of resources to the relay is transmitted to the relay through time division multiplexing (TDM) or frequency division multiplexing of both control and data channels of the relay.

Preferably, the step of dividing resource blocks into partitions may further include transmitting information to the relay via a higher layer control signal, the information including the total number of divided partitions, a size of each partition and a location of resources occupied by each partition.

Preferably, the partition determined for the allocation of resources to the relay may undergo time division multiplexing (TDM) or frequency division multiplexing of both control and data channels of the relay. And, a certain number of initial OFDM symbol transmission periods of the partition determined for the allocation of resources to the relay may be allocated as the control channel over the entire frequency band of the partition.

Preferably, the partition determined for the allocation of resources to the relay may undergo time division multiplexing (TDM) or frequency division multiplexing of both control and data channels of the relay, and the partition determined for the allocation of resources to the relay may include data of at least two relays. And, a control channel of each relay may be allocated with resources so as to match a resource location of a frequency domain to which data of the relay has been allocated.

Preferably, the step of determining whether or not each divided partition is allocated to the relay or the terminal as resources may include determining an object for resource allocation according to each partition such that a resource allocation area to the terminal and a resource allocation area to the relay are semi-persistent over the entire frequency domain. And, the partition determined for the allocation of resources to the relay may undergo time division multiplexing (TDM) or frequency division multiplexing of both control and data channels of the relay.

Preferably, each partition determined for the allocation of resources to the relay may be allocated with data of one relay. And, control information of another partition may be transmitted through a control channel of one partition.

To achieve these and other advantages and in accordance with the purpose of the present invention, as embodied and broadly described herein, there is also provided an apparatus for transmitting data, the apparatus comprising: a controller configured to divide downlink resources into at least two partitions, and to determine whether or not each of the divided partitions is allocated to a relay or a terminal as resources; and a transmitter configured to transmit data to the relay or the terminal through a downlink channel by allocating the data to the determined partition, wherein the partition determined for the allocation of resources is transmitted to the relay through division multiplexing (TDM) or frequency division multiplexing (FDM) of both control and data channels of the relay.

Preferably, the transmitter may transmit information to the relay via a higher layer control signal, the information including the total number of divided partitions, a size of each partition and a location of resources occupied by each partition.

Preferably, the partition determined for the allocation of resources to the relay may undergo time division multiplexing (TDM) or frequency division multiplexing of both control and data channels of the relay. And, a certain number of initial OFDM symbol transmission periods of the partition determined for the allocation of resources to the relay may be allocated as the control channel over the entire frequency band of the partition.

Preferably, the partition determined for the allocation of resources to the relay may undergo time division multiplexing (TDM) or frequency division multiplexing of both control and data channels of the relay, and the partition determined for the allocation of resources to the relay may include data of at least two relays. And, a control channel of each relay may be allocated with resources so as to match a resource location of a frequency domain to which data of the relay has been allocated.

Preferably, the controller may determine an object for resource allocation according to each partition such that a resource allocation area to the terminal and a resource allocation area to the relay are semi-persistent over the entire frequency domain. And, the partition determined for the allocation of resources to the relay may undergo time division multiplexing (TDM) or frequency division multiplexing of both control and data channels of the relay.

Preferably, each partition determined for the allocation of resources to the relay may be allocated with data of one relay. And, control information of another partition may be transmitted through a control channel of one partition.

To achieve these and other advantages and in accordance with the purpose of the present invention, as embodied and broadly described herein, there is still also provided an apparatus for receiving data, the apparatus comprising: a receiver configured to receive data transmitted from a base station through a backhaul link channel; and a decoder configured to blind-decode received data over a predetermined frequency domain, wherein the backhaul link channel is divided into two or more partitions in a frequency domain, the partitions undergo time division multiplexing (TDM) of both control and data channels of the relay, when succeeding in decoding the control signal at a specific location in a frequency domain, the decoder recognizes that a control signal has been allocated for a certain number of initial OFDM symbol transmission period including frequency resources occupied by a corresponding control channel or a corresponding control channel, and the decoder decodes scheduled data through the control signal.

The present invention may be effective as follows. Firstly, the base station dynamically performs a scheduling for resource allocation through a backhaul channel. This may enhance frequency selectivity and allow resources to be controlled according to a traffic amount.

Furthermore, according to the method for allocating backhaul link resources of the present invention, a backhaul link sub-frame between the base station and the relay may be transmitted and received together with a downlink sub-frame between the base station and the terminal. And, time delay occurring when decoding backhaul link data by the relay may be prevented.

DETAILED DESCRIPTION OF THE INVENTION

Figure 1:
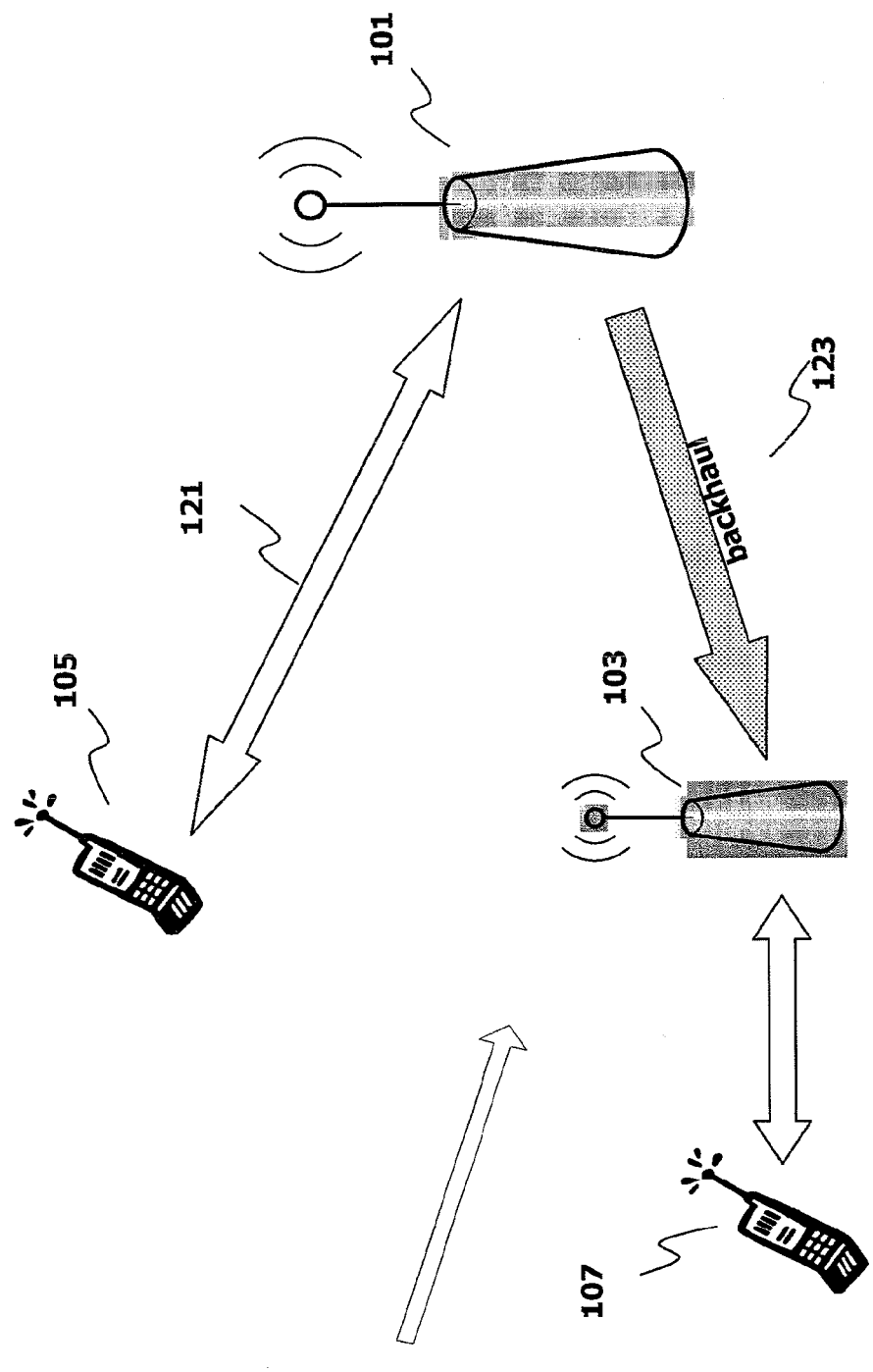
FIG. 1 is a view schematically illustrating a relay communication system.

Hereinafter, preferred embodiments of the present invention will be explained in more details with reference to the attached drawings. Wherever possible, the same reference numerals will be used through the drawings to refer to the same or similar parts, and the same descriptions thereof are omitted. However, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

A communication system of the present invention is a system for providing various communication services such as voice and packet data, and includes a base station, a relay and a terminal. The communication system will be explained with taking a Long Teem Evolution (LTE) system or an LTE-Advanced system as a representative example.

The terminal of the present invention may be referred to as a Subscriber Station (SS), a User Equipment (UE), a Mobile Equipment (ME), a Mobile Station (MS), etc., and includes a portable device having a communication function such as a portable phone, a PDA, a smart phone and a notebook, or an unportable device such as a PC and a vehicle-mounted device.

The base station of the present invention indicates a fixed point communicated with a terminal, which may be referred to as an eNB (evolved-NodeB), a BTS (Base Transceiver System), an AP (Access Point), etc. One base station may have one or more cells, and an interface for transmission of a user traffic or a control traffic may be used between base stations. A downlink indicates a communication channel from the base station to the terminal, and an uplink indicates a communication channel from the terminal to the base station.

A multiple access technique applied to a wireless communications system of the present invention may include CDMA (Code Division Multiple Access), TDMA (Time Division Multiple Access), FDMA (Frequency Division Multiple Access), SC-FDMA (Single Carrier-FDMA), OFDMA (Orthogonal Frequency Division Multiple Access), or well-known other modulation techniques.

A multiple access scheme for downlink transmission may be different from a multiple access scheme for uplink transmission. For instance, an OFDMA scheme may be used for downlink transmission, whereas an SC-FDMA scheme may be used for uplink transmission.

Hereinafter, preferred embodiments of the present invention will be explained in more details with reference to the attached drawings. Wherever possible, the same reference numerals will be used through the drawings to refer to the same or similar parts, and the same descriptions thereof are omitted.

In a relay communication system, a base station transmits a downlink signal to a relay through a backhaul link.

Figure 2:
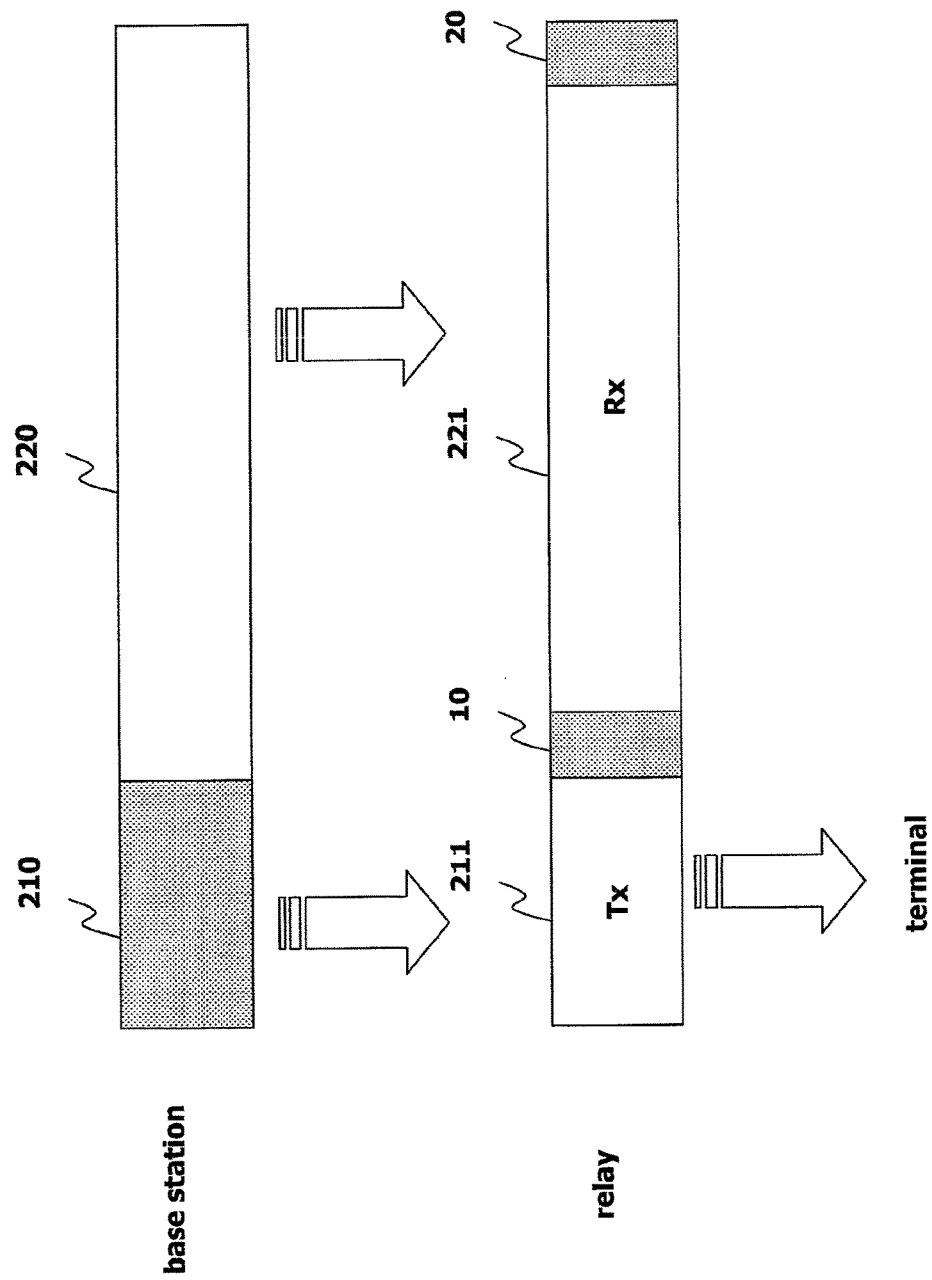
FIG. 2 is a view illustrating each sub-frame structure of base station and a relay.

FIG. 2 is a view illustrating each sub-frame structure of base station and a relay.

As shown, the sub-frame includes a control channel 210 and a data channel 220. The control channel 210 includes a PDCCH, etc., and the data channel 220 includes a PDSCH, etc. Preferably, in an LTE system, a plurality of PDCCHs perform an interleaving therebetween over the control channel so as to enhance reliability of a control channel by improving a frequency diversity.

In a sub-frame where the relay performs a downlink backhaul, the relay has to transmit, to the terminal, a PDCCH and a Common Reference Signal (CRS) through an access link for one (the first) to four OFDM symbol periods. More concretely, the relay operates in a transmission mode (Tx) for one (the first) to four OFDM symbol periods in a backhaul sub-frame, and has a transition gap 10 for converting into a reception mode (Rx) from a transmission mode (Tx).

The base station can transmit signals such as R-PDCCH and R-PDSCH to the relay at a region of PDSCH 220, i.e., after a time point when transmission through the PDCCH ended. Accordingly, when being completely ready to receive a signal from the base station with consideration of a PDCCH transmission symbol period and the transition gap 10 of the base station, the relay receives, from the base station, a relay control channel such as R-PDCCH and a relay data channel such as R-PDSCH for a reception mode period 221 thereof.

After completely receiving the control channel and the data channel form the base station, the relay converts the current mode from the reception mode (Rx) to the transmission mode (Tx) so as to transmit a control channel to the terminal through an access link in the next sub-frame. Here, the relay configures a guard time, a transition gap 20 for mode conversion.

Under this configuration, the relay cannot transmit or receive data at symbols corresponding to the transition gaps 10 and 20. Accordingly, a signal which should be received by the relay has to be transmitted at a symbol corresponding to a transition-completed section, not a symbol corresponding to a transition start section. Therefore, there occurs a limitation in the number of symbols of sub-frames which can be used as substantial backhauls in a backhaul link sub-frame by the relay.

According to a backhaul design method, the sub-frame transmitted to a backhaul link may be divided into variable sections 10 and 20 where a signal cannot be received by the relay, and a fixed section 221 where a signal can be received by the relay. As shown, the variable sections 10 and 20 may be symbols of guard times corresponding to a transmission section 711 of the relay, and the transition gap 10 for converting the current mode to a reception mode from a transmission mode, or the transition gap 20 for converting the current mode to a transmission mode from a reception mode.

Both of the variable sections 10 and 20, or only one of them may be implemented according to a backhaul design method. For instance, the variable section 20 may be omitted according to a timing design of the relay.

Figure 3:
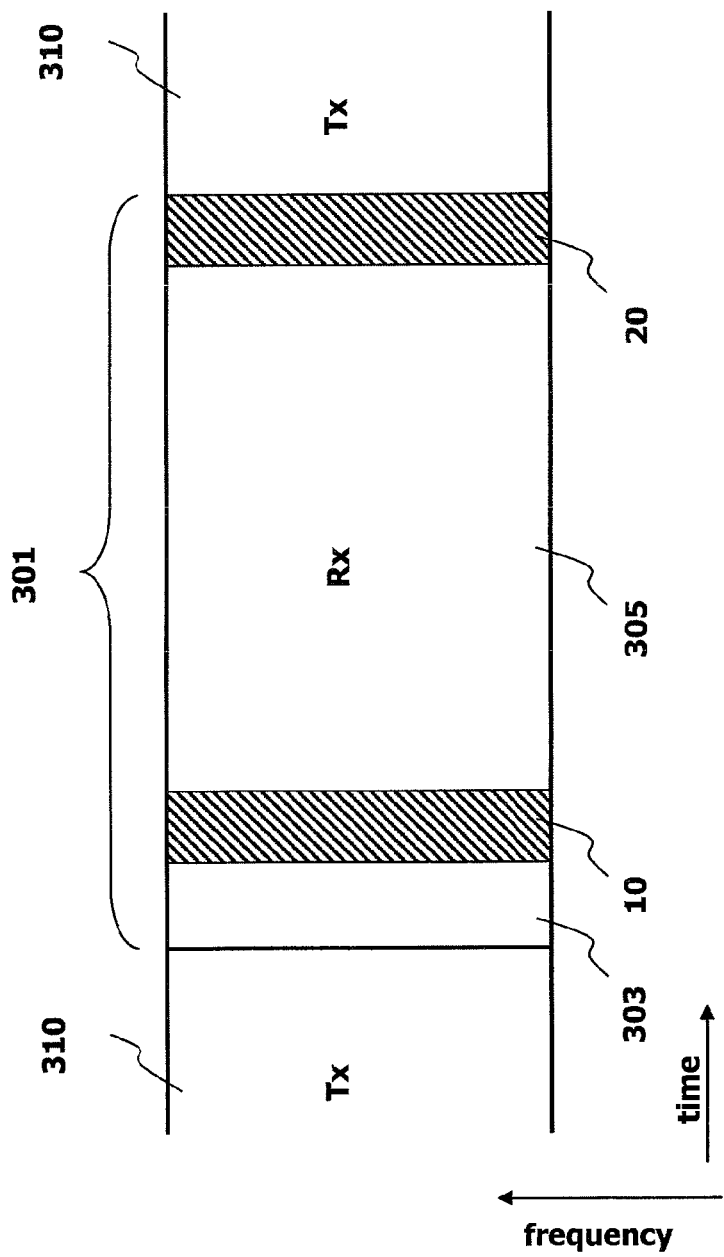
FIG. 3 is a view illustrating an operation to transmit and receive a signal by a relay when backhaul link data consists of MBSFN sub-frames.

FIG. 3 is a view illustrating an operation to transmit and receive a signal by the relay when backhaul link data consists of MBSFN (Multicast Broadcast Single Frequency Network) sub-frames.

For instance, in a 3GPP E-UTRA (Evolved Universal Terrestrial Radio Access) system, sub-frames received by the relay through a backhaul link may consist of MBSFN sub-frames. In a transmission mode (Tx) of the relay, a downlink sub-frame 310 is generally transmitted. In a reception mode (Rx) of the relay, a backhaul link sub-frame 301 transmitted from the base station is received.

The relay may transmit a control channel (PDCCH) to terminals connected thereto for one or two initial OFDM symbol periods of the backhaul sub-frame 301. And, the relay may receive a downlink signal from the base station for data symbol periods 305 after the transition gap 10. Then, the transition gap 20 may be configured for conversion of the relay from the reception mode (Rx) to the transmission mode (Tx).

The base station may allocate radio resources to the relay in a semi-persistent manner or in a dynamic manner through a backhaul link channel according to a specific relay.

Hereinafter, a method for allocating radio resources through a backhaul link channel by the base station will be explained in more details.

Figure 4:
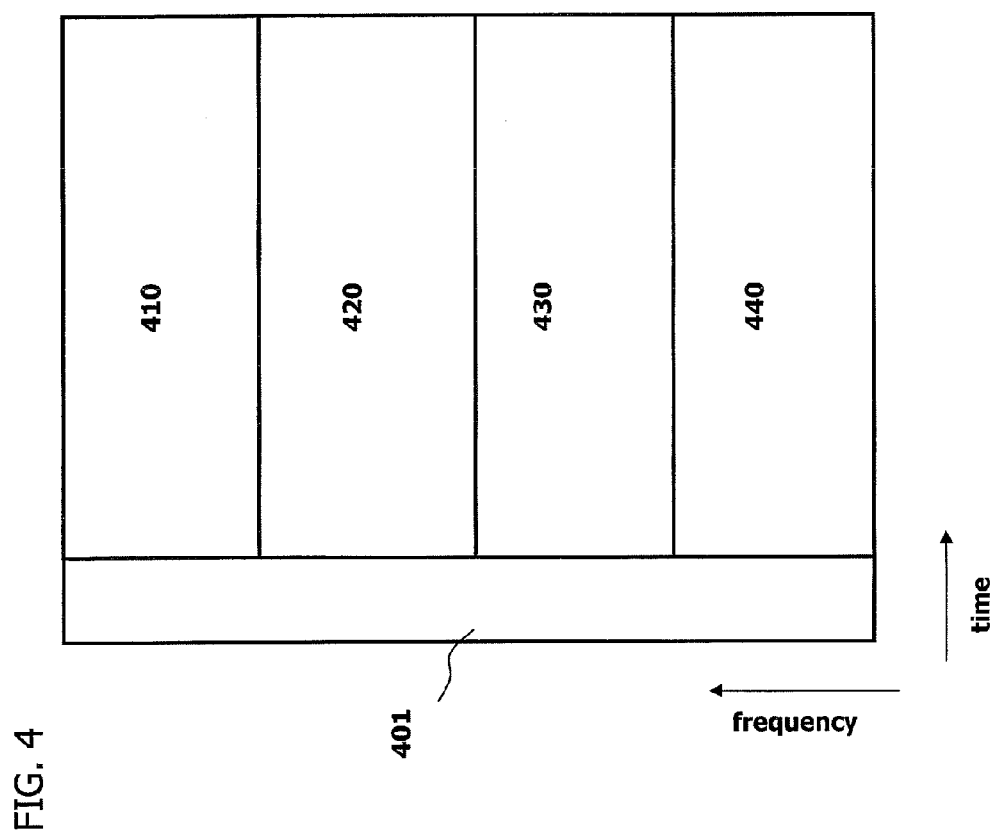
FIG. 4 is a view illustrating a configuration to divide resources of a backhaul link channel into a plurality of partitions in a frequency domain according to a first embodiment of the present invention.

FIG. 4 is a view illustrating a configuration to divide resources of a backhaul link channel into a plurality of partitions in a frequency domain according to a first embodiment of the present invention.

As shown, the base station divides radio resources after an OFDM symbol period 401 into two or more partitions in a frequency domain, the radio resources transmitted through a PDCCH for transmitting control information of the terminal directly connected to the base station through a link.

In FIG. 4, it is assumed that the total number of divided partitions is four (410, 420, 430 and 440). The partitions may have a constant size or different sizes from each other. The base station transmits information to the relay via a higher layer control signal, the information including the total number of divided partitions, a size of each partition and a location of resources occupied by each partition.

Then, the base station determines whether to allocate each partition to the terminal directly connected thereto through a link, or to a backhaul link for the relay when performing a downlink scheduling of a corresponding sub-frame.

Like in the conventional art, data (PDSCH) transmitted to the terminal is transmitted to each partition allocated to the terminal. And, scheduling information is included in a PDCCH 401 transmitted to the terminal. Therefore, in a case that one partition is used for transmission to the terminal, two or more data channels (PDSCH) may exist in one partition.

To the partition allocated as a backhaul link for the relay, should be transmitted a data channel (R-PDSCH) transmitted to the relay and a control channel (R-PDCCH) through which scheduling information is transmitted.

Here, a backhaul link partition determined for the allocation of resources to the relay may be transmitted to the relay through time division multiplexing (TDM) or frequency division multiplexing (FDM) of both control and data channels of the relay.

Figure 5:
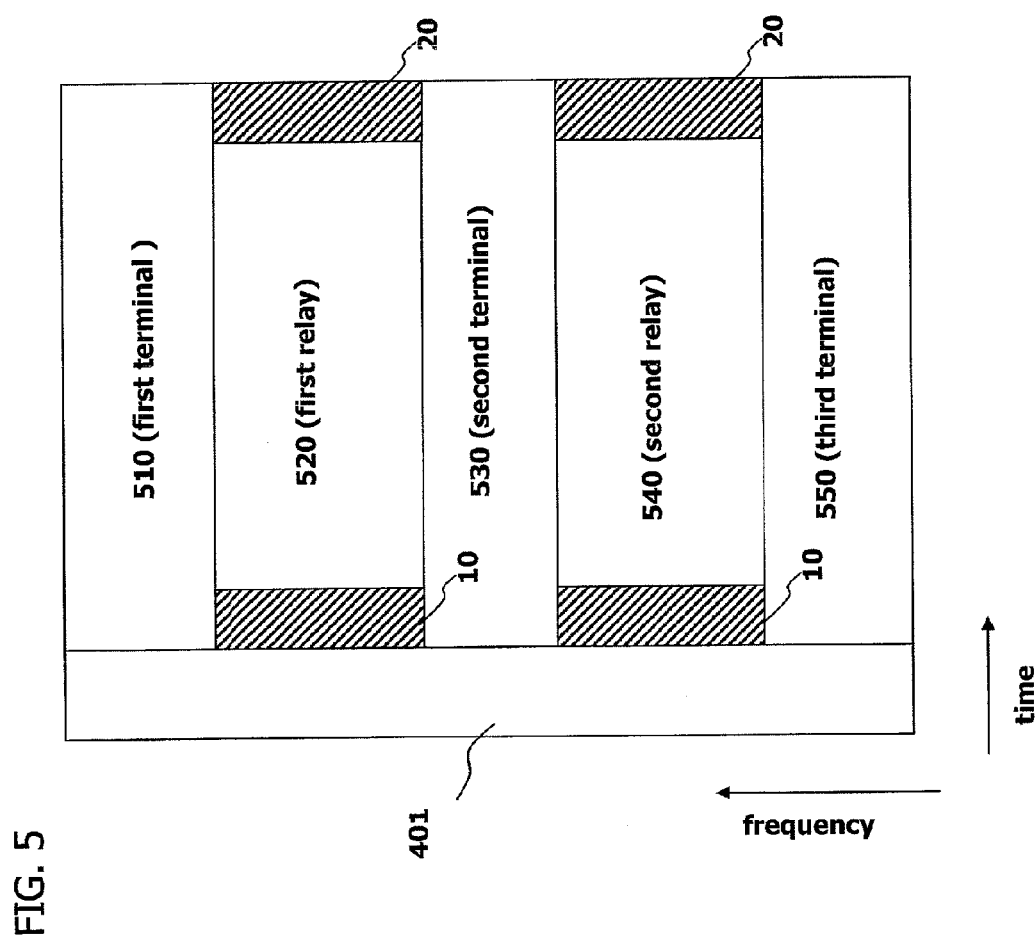
FIG. 5 is a view illustrating an embodiment in which backhaul link resources are allocated to a relay in a semi-persistent manner.

FIG. 5 is a view illustrating an embodiment in which backhaul link resources are allocated to a specific relay in a semi-persistent manner.

In FIG. 5, a frequency domain in which the backhaul data is transmitted is constantly configured in one sub-frame so that backhaul data transmitted to the relay from the base station coexists with data transmitted to the terminal directly connected to the base station. That is, since the base station allocates resources to the relay in a semi-persistent manner, an additional control channel (R-PDCCH) is not required. And, the base station may transmit the backhaul data through the resources allocated to the specific relay in a semi-persistent manner.

Referring to FIG. 5, the base station divides radio resources after the OFDM symbol period 401 into five partitions in a frequency domain, the OFDM symbol period 401 where the PDCCH for transmitting control information of the terminal directly connected to the base station through a link is transmitted. Then, the base station determines whether to allocate each partition to the terminal directly connected thereto through a link, or to a backhaul link for the relay when performing a downlink scheduling of a corresponding sub-frame.

Referring to FIG. 5, the base station allocates a first partition to a first terminal, a second partition to a first relay, a third partition to a second terminal, a fourth partition to a second relay, and a fifth partition to a third terminal Here, the second and fourth partitions where backhaul data is transmitted to the first and second relays allocate resources to the respective relays in a semi-persistent manner. This may require no additional control channel (R-PDCCH), and the base station may transmit backhaul data through the resources allocated to the specific relay in a semi-persistent manner.

However, when resources are allocated to the relay in a semi-persistent manner, a dynamic scheduling is difficult to have a restriction on controlling resource allocation according to a traffic amount.

Figure 6:
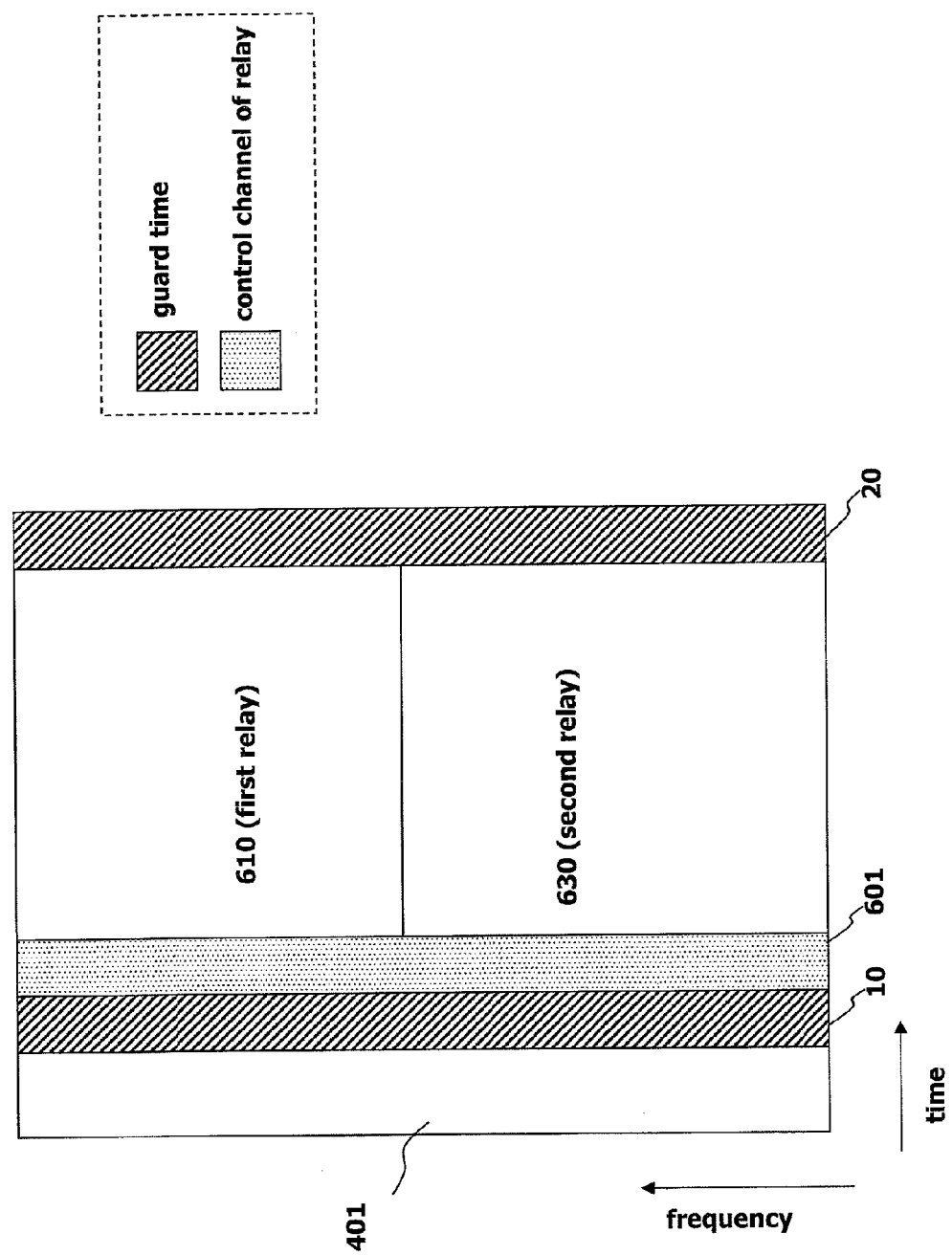
FIG. 6 is a view illustrating an embodiment in which backhaul link resources are allocated through time division multiplexing (TDM) of both control and data channels.

FIG. 6 is a view illustrating an embodiment in which backhaul link resources are allocated through time division multiplexing (TDM) of both control and data channels.

When dynamically allocating resources to the relay according to a traffic amount, required is scheduling information indicating locations of resources allocated to the respective relays, a used modulation and coding scheme (MCS), etc. This scheduling information is transmitted to the relay through a control channel (Control Channel; CCH). For one or two initial OFDM symbol periods in a sub-frame where backhaul data is received, the relay cannot receive the PDCCH 401 transmitted from the base station since its PDCCH is transmitted. Therefore, an additional control channel 601 for the relay has to exist after a transmission time point of the PDCCH.

In the embodiment of FIG. 6, the base station divides radio resources after the OFDM symbol period 401 into two partitions in a frequency domain, the OFDM symbol period 401 where the PDCCH for transmitting control information of the terminal directly connected to the base station through a link is transmitted. Then, the base station allocates a first partition as backhaul data transmitted to a first relay, and allocates a second partition as backhaul data for transmission to a second relay. And, the base station allocates the data as a control channel 601 of the first and second relays by using the entire frequency band of predetermined OFDM symbol periods after the guard time 10.

The control channel and the backhaul data channel of the relay undergo time division multiplexing (TDM). Accordingly, the base station transmits the control channel 601 to the relay by using the entire frequency band for a partial OFDM symbol transmission period after transmitting the PDCCH 401. And, backhaul data 610 and 630 is transmitted according to scheduling information included in the control channel 601 of the relay.

However, in the embodiment of FIG. 6, the control channel of the relay occupies the entire frequency band. This may cause a problem that a data channel of the terminal directly connected to the base station through a link can not be configured together.

Figure 7:
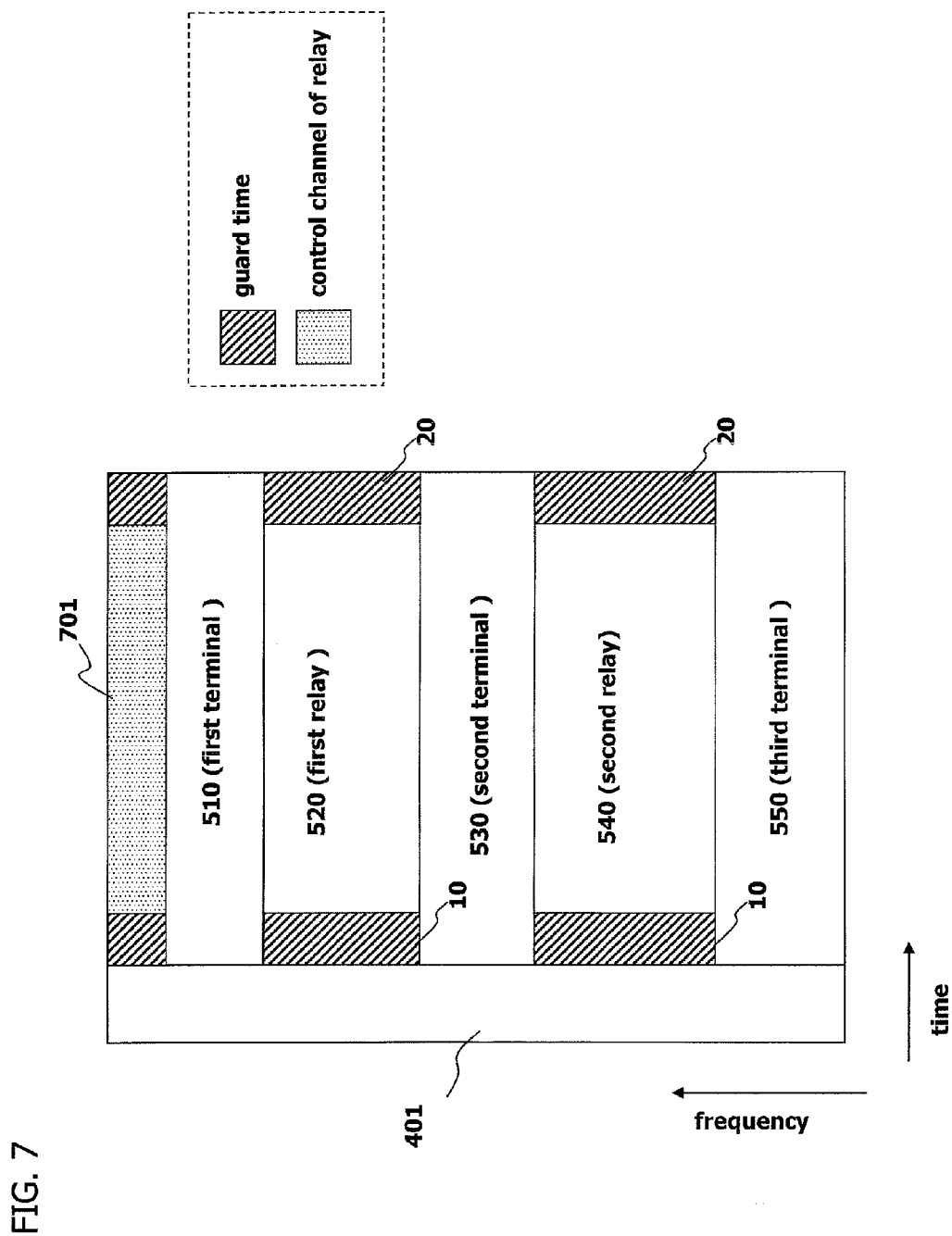
FIGS. 7 and 8 are views illustrating an embodiment in which backhaul link resources are allocated through frequency division multiplexing (FDM) of both control and data channels.
Figure 8:
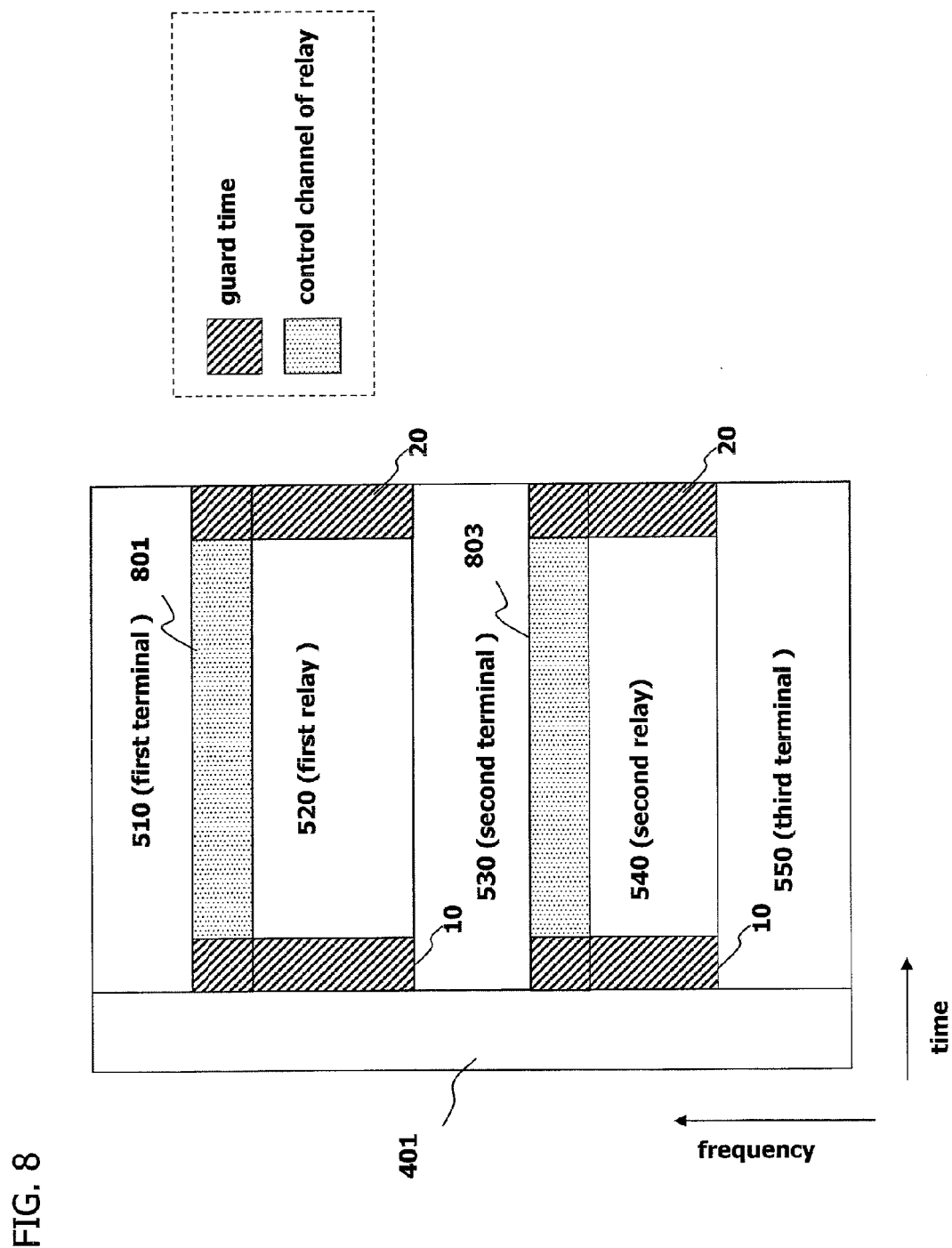

FIGS. 7 and 8 are views illustrating an embodiment in which backhaul link resources are allocated through frequency division multiplexing (FDM) of both control and data channels.

As shown in FIGS. 7 and 8, the control channel of the relay may be transmitted through FDM together with backhaul data. More concretely, the base station transmits the control channel by using some of frequency resources, and transmits the backhaul data according to scheduling information included in the control channel.

In the embodiment of FIG. 7, the base station divides radio resources after the OFDM symbol period 401 into six partitions in a frequency domain, the OFDM symbol period 401 where the PDCCH for transmitting control information of the terminal directly connected to the base station through a link is transmitted. Then, the base station allocates a first partition to one control channel 701 to which scheduling information of all the relays is transmitted, a second partition to a data channel 510 of a first terminal, a third partition to a data channel 520 of a first relay, a fourth partition to a data channel 530 of a second terminal, a fifth partition to a data channel 540 of a second relay, and a sixth partition to a data channel 550 of a third terminal.

Alternatively, as shown in the embodiment of FIG. 8, the respective relays are allocated with independent control channels 801 and 802. This may allow each relay to easily find its scheduling information. In this case, a location and a size of the control channel of the relay may be determined in a semi-persistent manner, thereby being transmitted to the relay via a higher layer signal.

However, in the embodiments of FIGS. 7 and 8, decoding delay may occur since the relays can decode the backhaul data channels 520 and 540 after decoding the control channels 801 and 803 thereof.

Hereinafter, will be explained a method for allocating resources capable of performing resource allocation by dividing backhaul link resources into a plurality of partitions, through time division multiplexing (TDM) of a control channel and a backhaul data channel of a relay, and capable of capable of implementing a data channel of a terminal directly connected to a base station.

As shown in FIG. 4, the base station divides resources of a backhaul link channel into at least two partitions in a frequency domain with respect to the entire resource regions excluding a control channel region 401 of a Macro UE. Then, the base station determines whether or not each divided partition is allocated to the relay or the terminal as resources. And then, the base station allocates resources to a partition determined for the allocations of the resources through time division multiplexing (TDM) of both control and data channels of the relay.

Accordingly, to a partition allocated as a backhaul link channel of the relay, a control channel of the relay is firstly transmitted over the entire frequency band of the corresponding partition for a certain number of initial OFDM symbol periods. The control channel has a field indicating a result that radio resources of the corresponding partition are allocated as backhaul data of each relay. Each relay decodes a control channel of each partition, and decodes backhaul data of a subsequent resource region according to scheduling information included in the control channel. Therefore, the control information and the backhaul data of the relay undergo time division multiplexing (TDM) in one partition, and one partition allocated to the relay may have backhaul data to be transmitted to two or more relays. Furthermore, the base station may transmit backhaul data to one relay through two or more partitions different from each other.

Figure 9:
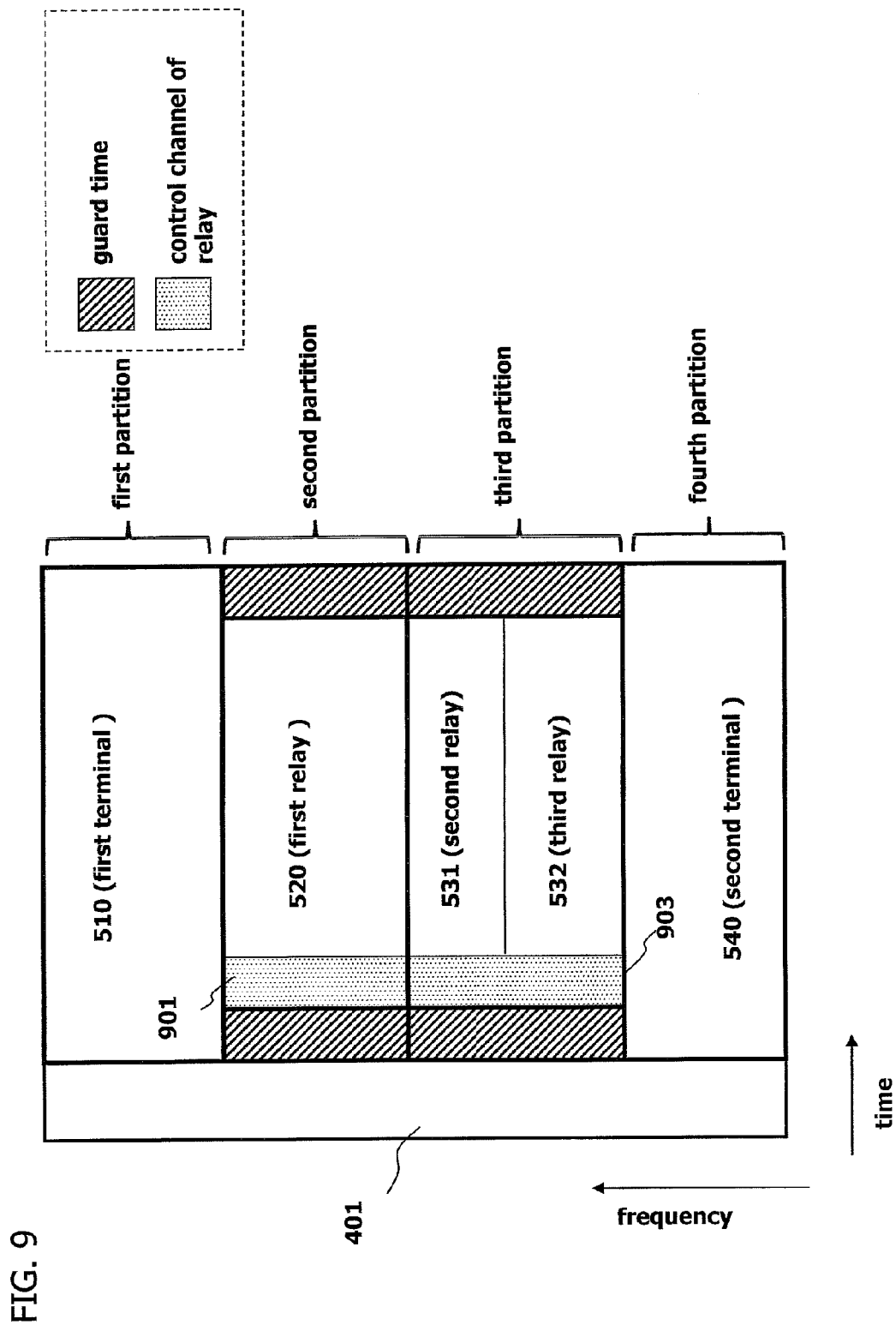
FIG. 9 is a view illustrating an embodiment in which backhaul link resources are allocated by being divided into a plurality of partitions such that data channels of a terminal and a relay coexist over a backhaul link channel.

FIG. 9 is a view illustrating an embodiment in which backhaul link resources are allocated by being divided into a plurality of partitions such that data channels of the terminal and the relay coexist over a backhaul link channel.

As shown, the base station divides radio resources after the OFDM symbol period 401 into four partitions in a frequency domain, the OFDM symbol period 401 where the PDCCH for transmitting control information of a macro terminal (Macro UE) directly connected to the base station through a link is transmitted. Then, the base station allocates first and fourth partitions as data channels 510 and 540 of a first macro terminal and a second terminal, and allocates second and third partitions as backhaul channels 520 and 530 of the relay.

To the second and third partitions, control channels 901 and 903 of the relay are allocated over the entire frequency bands for a certain number of initial OFDM symbol periods. However, FIG. 9 merely illustrates one example of the present invention. That is, the control channels may be also transmitted through all the OFDM symbol periods of the corresponding partition. The control channels of the relays of the respective partitions may have an interleaving structure therebetween. As shown in FIG. 9, the control channel transmitted to one relay may be restricted to exist on only one partition for simplified decoding of the relay. As a result, the control channels transmitted in the same partition may be interleaved with each other in a corresponding partition, but the control channels transmitted in different partitions may not be interleaved with each other.

In a third partition, two backhaul data channels 531 and 532 may undergo frequency division multiplexing (FDM) to be allocated to second and third relays, respectively. However, the two backhaul data channels 531 and 532 may undergo time division multiplexing (TDM) to be allocated to different OFDM symbols.

The control channels 901 and 903 of the relays may include control information (scheduling information) of the first relay, the second relay and/or the third relay. That is, the control channel 901 of the second partition may include scheduling information of the first relay, the second relay or the third relay. And, the control channel 903 of the third partition may also include scheduling information of the first relay, the second relay and/or the third relay.

Upon success of decoding a control channel in a specific partition, each relay recognizes that the control signal has been allocated for a certain number of initial OFDM symbol transmission periods of the partition including the control channel. And, the relay decodes backhaul data by recognizing that a partition of which control channel has not been decoded has no relay control signal.

Figure 10:
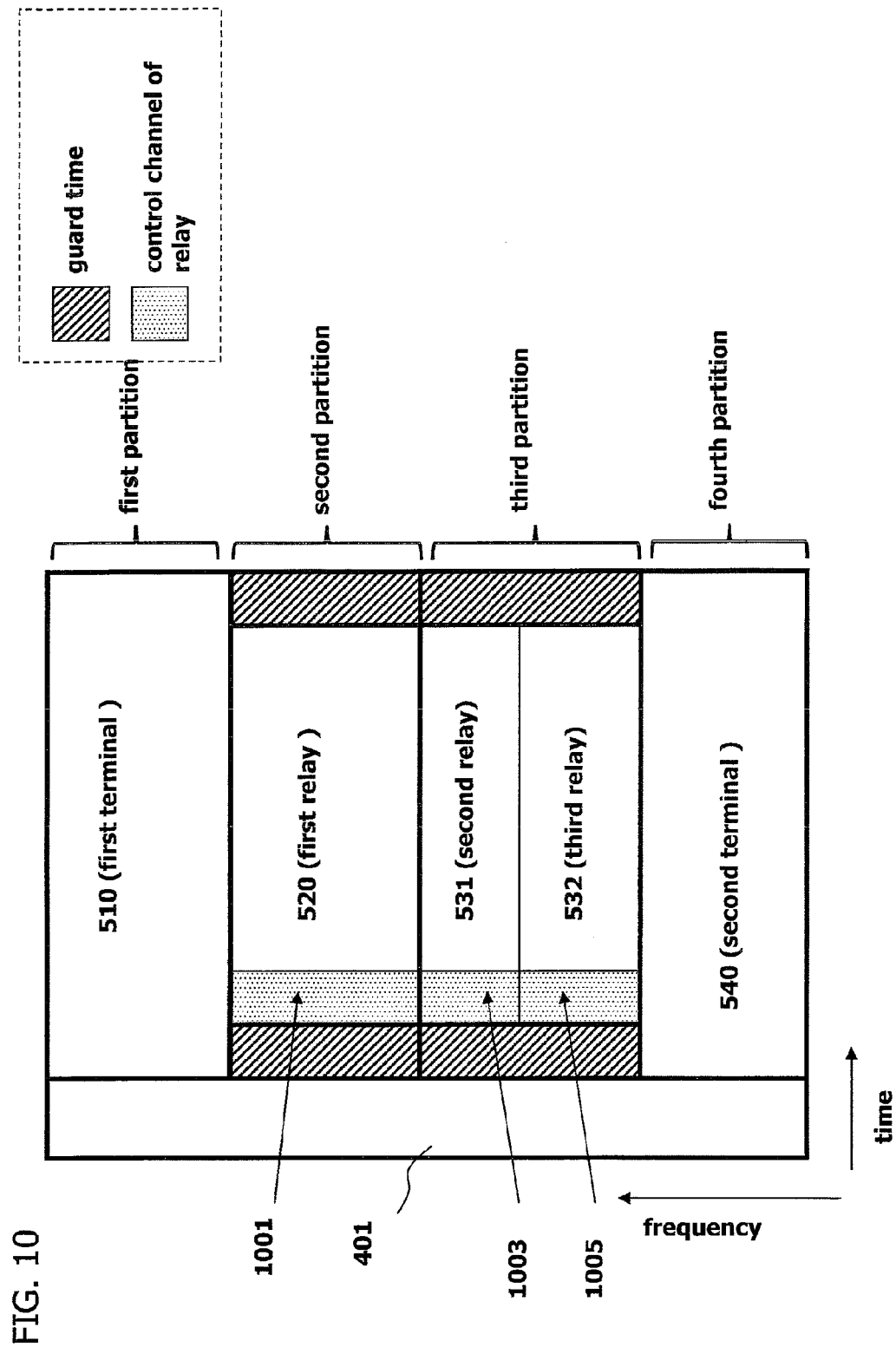
FIG. 10 is a view illustrating another embodiment in which backhaul link resources are allocated by being divided into a plurality of partitions such that data channels of a terminal and a relay coexist over a backhaul link channel.

FIG. 10 is a view illustrating another embodiment in which backhaul link resources are allocated by being divided into a plurality of partitions such that data channels of the terminal and the relay coexist over a backhaul link channel.

According to another embodiment of FIG. 10, in a case where backhaul data toward two or more relays exist in one partition, a size of a control channel corresponding to each backhaul data is controlled. This may control a location and the amount of resources of backhaul data allocated to the relay.

As shown, if the base station transmits backhaul data 531 and 532 to at least two relays in one partition (third partition), the number and a location of frequency domain resources (resource block) occupied by a control channel of each relay are set to be consistent with the number and a location of backhaul data transmitted to the corresponding relay. More concretely, a first partition and a second partition are allocated as a backhaul channel of the relay, in which the first partition is allocated as a backhaul channel of a first relay, and the second partition is allocated as a backhaul channel for transmission of backhaul data of a second relay and a third relay. Here, control channels 1003 and 1005 of the second relay and the third relay are allocated to be consistent with sizes of resources occupied by backhaul data of the second and third relays.

The relay decodes a control channel with a cyclic redundancy check (CRC) masked by using its ID. Upon success of decoding a control channel at a specific location, the relay recognizes that frequency resources occupied by the control channel are allocated as backhaul data transmitted thereto. Then, the relay performs decoding of the backhaul data. The relay repeatedly performs the operations over a predetermined domain, and decodes backhaul data transmitted thereto. Under this scheme, the control channel of the relay requires no information on resource allocation. Furthermore, and a location and the amount of resources of backhaul data to the corresponding relay may be controlled. As a result, backhaul data to a plurality of relays may be effectively multiplexed to one partition having a fixed size.

In order to enhance a decoding performance with respect to the control channel of each relay and to reduce complexity, the number of frequency domain resources (or size of a resource block) occupied by the control channel of the relay may be restricted to one of some candidates. As an example to restrict a size of the control channel of the relay, the number of frequency domain resources occupied by the control channel of the relay may be restricted to multiples of a constant value.

Without specific information transmitted from the base station, each relay cannot check which partition has been allocated for transmission of its backhaul data, and where backhaul data transmitted thereto exists. And, each relay may check a location of resources allocated thereto, etc. by decoding its control channel. Accordingly, the control channel of the relay may be designed to have a fixed format, location, resource amount and MCS level so that the relay can check scheduling information through decoding. Alternatively, the control channel may be designed to have restricted types so that the relay can easily perform blind decoding.

In some cases, in order to reduce the number of times that the relay attempts blind decoding, the base station may restrict a candidate group of partitions which can be allocated to the relay in a semi-persistent manner. And, the base station may inform each relay of a candidate group of partitions which can be allocated to the relay via a higher layer signal. In this case, the number of times that the relay attempts blind decoding may be reduced since the relay performs blind decoding with respect to only partitions which can be allocated as a backhaul link.

Figure 11:
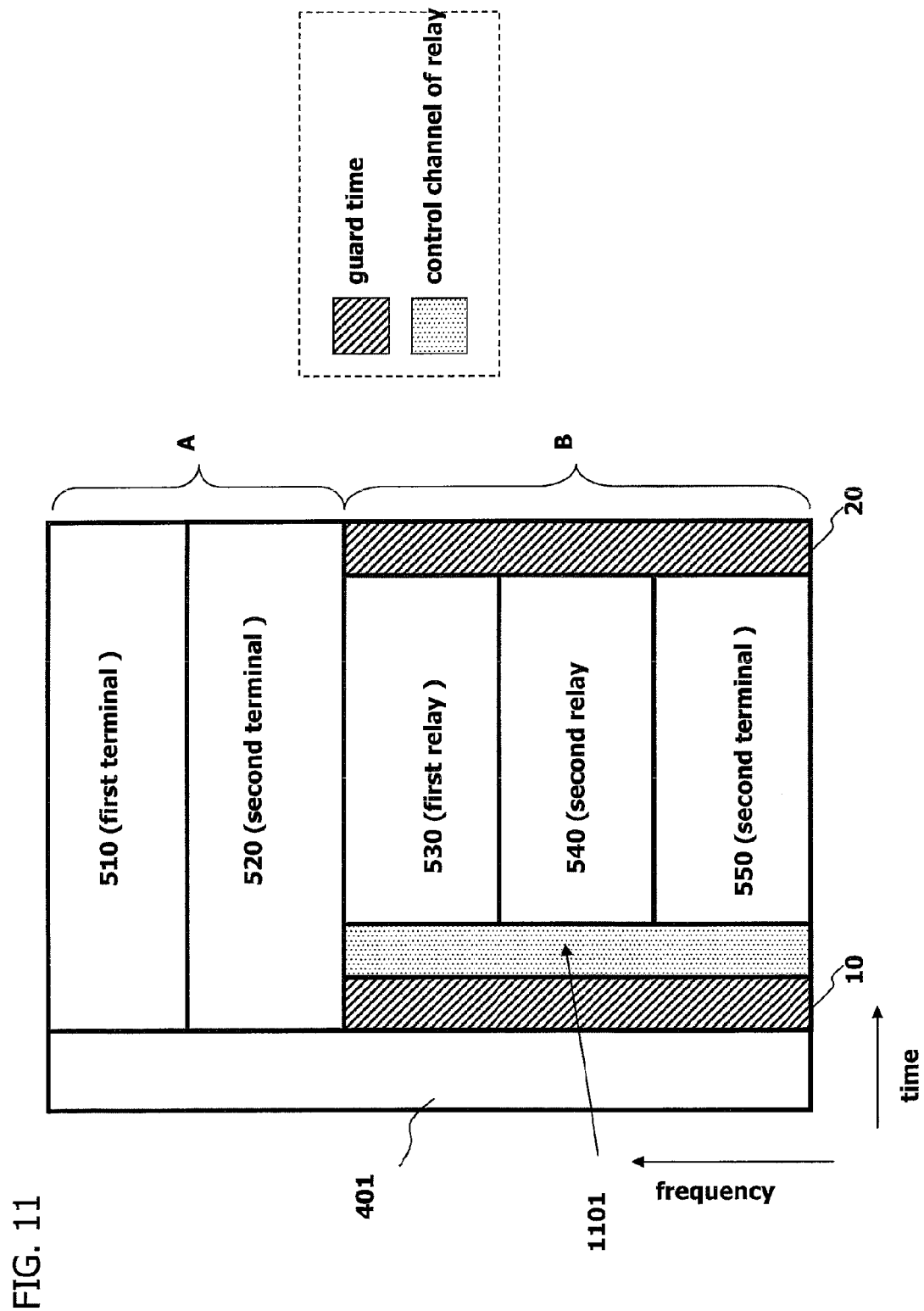
FIG. 11 is a view illustrating an embodiment in which the entire frequency resources are classified into a region for allocation to a terminal, and a region for allocation to a relay.

FIG. 11 is a view illustrating an embodiment in which the entire frequency resources are classified into a region for allocation to the terminal, and a region for allocation to the relay.

As shown, backhaul link frequency resources are semi-persistently classified into a region of 'A' where backhaul link frequency resources are allocated to the terminal, and a region of 'B' where backhaul link frequency resources are allocated as a backhaul link of the relay. In the region of 'B', a control channel 1101 of the relay is allocated over the entire frequency band, and backhaul data of the relay may be allocated to each relay according to each partition 530, 540 and 550. Therefore, the relay has only to perform blind decoding of the control channel 1101 with respect to the region of 'B' allocated thereto, not over the entire frequency band. This may shorten decoding time.

According to another embodiment of the present invention, the base station may semi-persistently restrict a candidate group of partitions which can be allocated to each relay, and may inform each relay via a higher layer signal. In this case, each relay has only to perform blind decoding with respect to only partitions which can be allocated thereto. This may reduce the number of times that each relay performs blind decoding.

Figure 12:
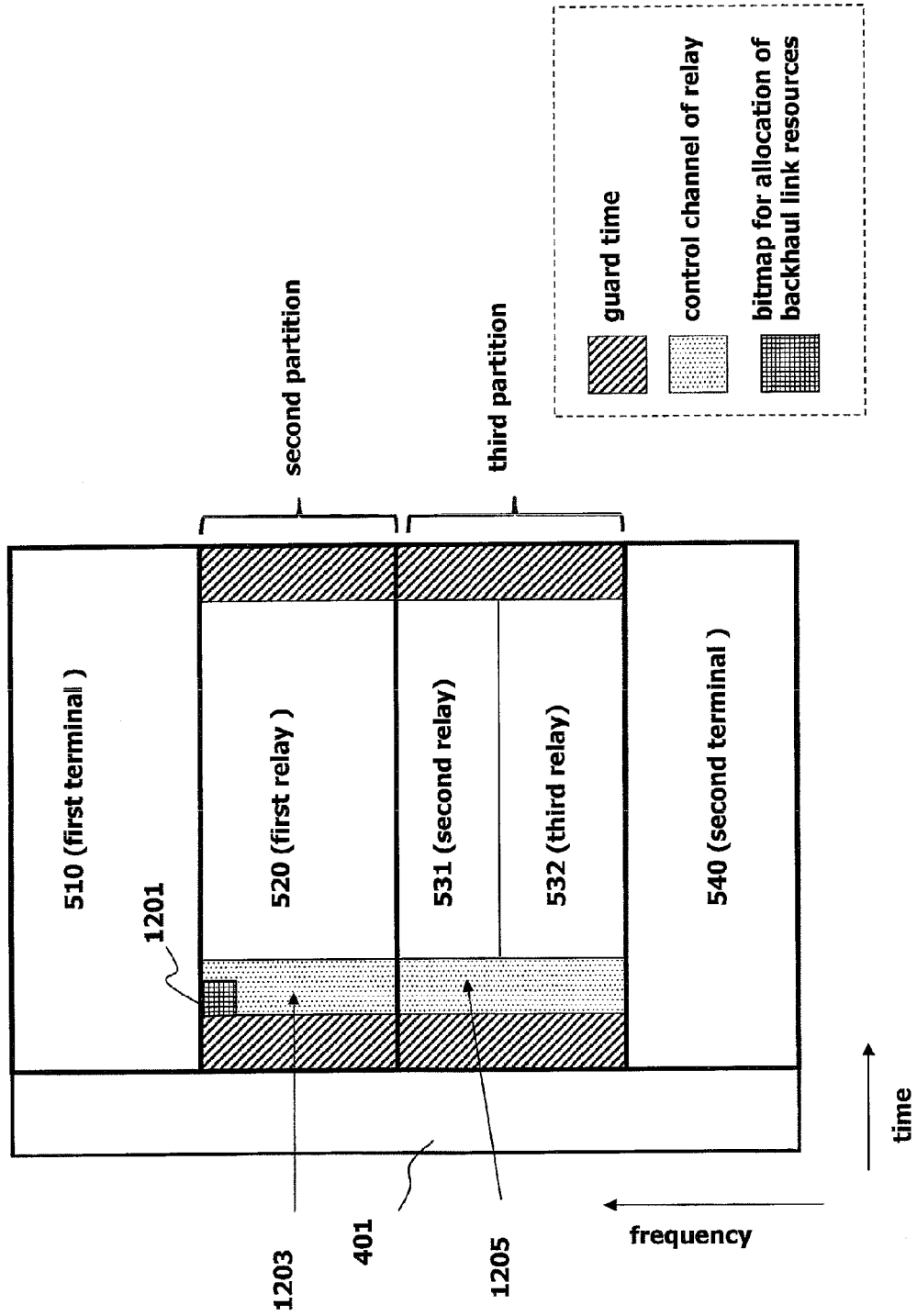
FIG. 12 is a view illustrating an embodiment to indicate a location of a partition allocated as a backhaul link through a bit map.

FIG. 12 is a view illustrating an embodiment to indicate a location of a partition allocated as a backhaul link through a bit map.

As shown, the base station may transmit a bitmap 1201 to each relay by using predetermined some OFDM symbols, the bitmap indicating whether each partition has been allocated as a backhaul link.

The relays may check a type of partitions allocated as a backhaul link by decoding the bitmap 1201, and may perform blind decoding with respect to only a control channel of partitions allocated as a backhaul link between control channels 1203 and 1205.

As shown, the bitmap 1201 is included in some OFDM symbols of the second partition. This may allow each of the first relay, the second relay and the third relay to check a control channel including its control information through the bitmap.

According to another embodiment of the present invention, the bitmap may be transmitted by utilizing resources of two or more different partitions, and the partition where the bitmap exists may be set (established) to be always allocated as a backhaul link channel.

According to another embodiment of the present invention, the control channel transmitted to the relay may exist only in some of the entire frequency domain of one partition allocated to the relay.

Figure 13:
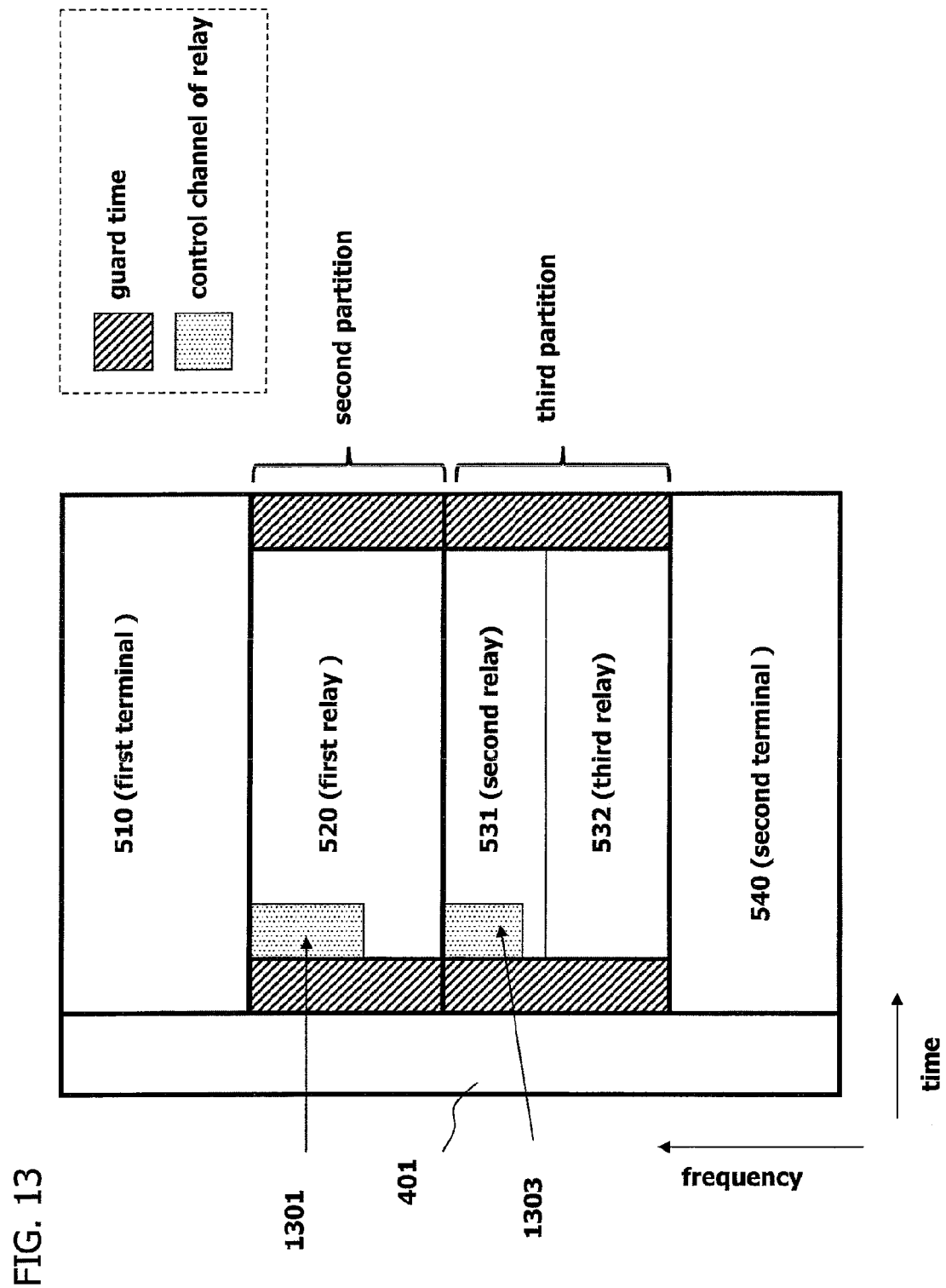
FIG. 13 is a view illustrating an embodiment in which a control channel of a relay is allocated to occupy only part of a frequency domain of a partition allocated as a backhaul channel.

FIG. 13 is a view illustrating an embodiment in which a control channel of a relay is allocated to occupy only part of a frequency domain of a partition allocated as a backhaul channel.

As shown, a second partition and a third partition are allocated to first to third relays as backhaul link channels.

To the second partition, backhaul data of the first relay is allocated. A location of a control channel 1301 of the second partition corresponds to one or more initial OFDM symbols of the second partition. Here, the control channel 1301 of the second partition may not be allocated over the entire frequency domain of the second partition, but may be allocated over part of the entire frequency domain. In this case, a frequency domain having not been allocated as the control channel 1301 may be used to transmit backhaul data.

The third partition is allocated as backhaul data of the second and third relays is allocated. Like in the second partition, a control channel 1303 of the third partition may not be allocated over the entire frequency domain of the third partition, but may be allocated over some of the entire frequency domain. In this case, a frequency domain having not been allocated as the control channel 1303 may be used to transmit backhaul data.

The control channels 1301 and 1303 may include control information (scheduling information) of the first relay, the second relay or the third relay. That is, the control channel 1301 of the second partition may include scheduling information of the first relay, the second relay and/or the third relay. And, the control channel 1303 of the third partition may also include scheduling information of the first relay, the second relay and/or the third relay.

Figure 14:
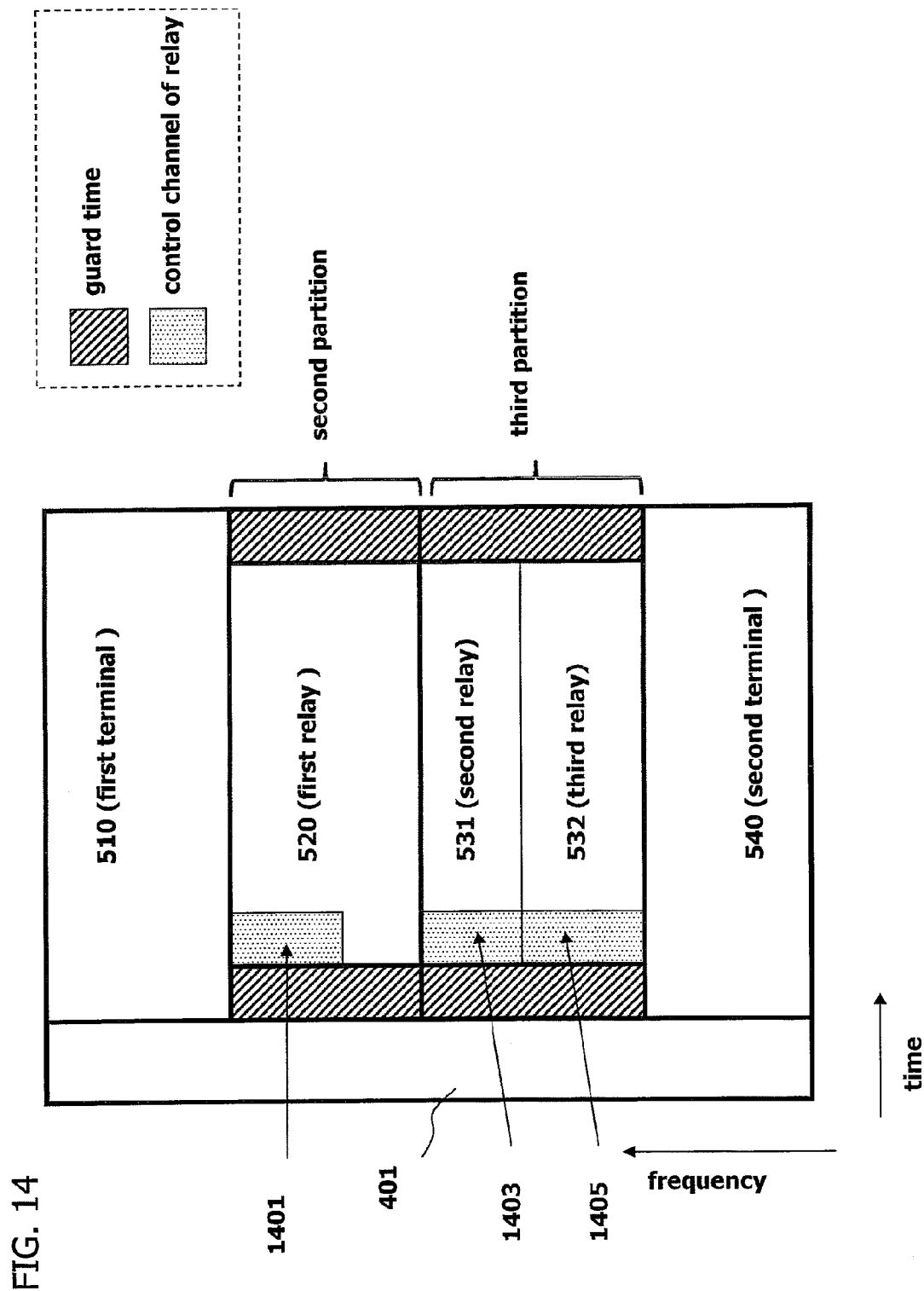
FIG. 14 is a view illustrating an embodiment in which a control channel of a relay is allocated to occupy only part of a frequency domain of a partition allocated as a backhaul channel.

FIG. 14 is a view illustrating an embodiment in which a control channel of a relay is allocated to occupy only part of a frequency domain of a partition allocated as a backhaul channel.

As shown, a second partition and a third partition are allocated to first to third relays as backhaul link channels.

Here, the number and a location of frequency domain resources (resource block) occupied by a control channel of each relay are set to be consistent with the number and a location of backhaul data transmitted to the corresponding relay. More concretely, a first partition and a second partition are allocated as a backhaul channel of the relay, in which the first partition is allocated as a backhaul channel of a first relay, and the second partition is allocated as a backhaul channel for transmission of backhaul data of a second relay and a third relay. Here, control channels 1403 and 1405 of the second relay and the third relay are allocated to be consistent with sizes of resources occupied by backhaul data of the second and third relays, respectively.

As shown, to the second partition, backhaul data of the first relay is allocated. A location of a control channel 1401 of the second partition corresponds to one or more initial OFDM symbols of the second partition. Here, the control channel 1401 of the second partition may not be allocated over the entire frequency domain of the second partition, but may be allocated over part of the entire frequency domain. In this case, the control channel 1401 may include scheduling information of the first relay, and a frequency domains having not been allocated as the control channel 1401 may be used to transmit backhaul data of the first relay.

To the third partition, backhaul data of the second and third relays is allocated. The control channels 1403 and 1405 of the third partition are allocated to be consistent with sizes of resources occupied by backhaul data of the second and third relays, respectively.

Figure 15:
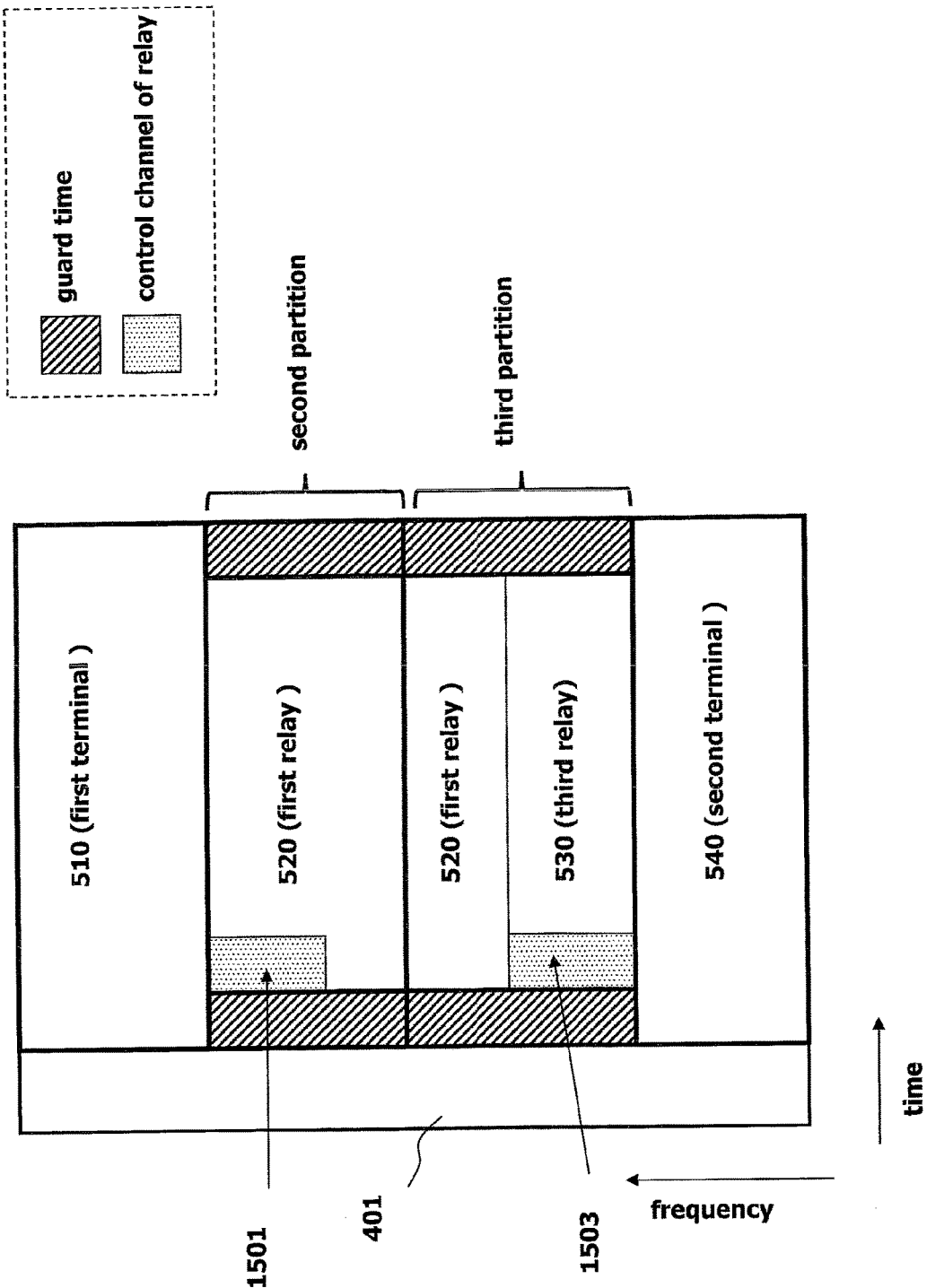
FIG. 15 is a view illustrating an embodiment in which a control channel is allocated for transmission of resources which exist in another partition.

FIG. 15 is a view illustrating an embodiment in which a control channel is allocated for delivery of scheduling information on resources which exist in another partition.

In this embodiment, frequency resources of another partition are scheduled through a control channel in one partition. More concretely, a first relay receives backhaul data 520 by being allocated with some frequency resources of second and third partitions, and scheduling information thereof is transmitted through a control channel 1501 of the first relay which exists in the second partition. In the third partition, the control channel of the first relay does not exist.

Therefore, it is possible to schedule some of frequency resources of another partition through a control channel of one partition.

For simple implementations of resource allocation of the relay and a data receiving operation, scheduling is performed so that backhaul data for one relay is allocated to one partition according to another embodiment of the present invention.

Figure 16:
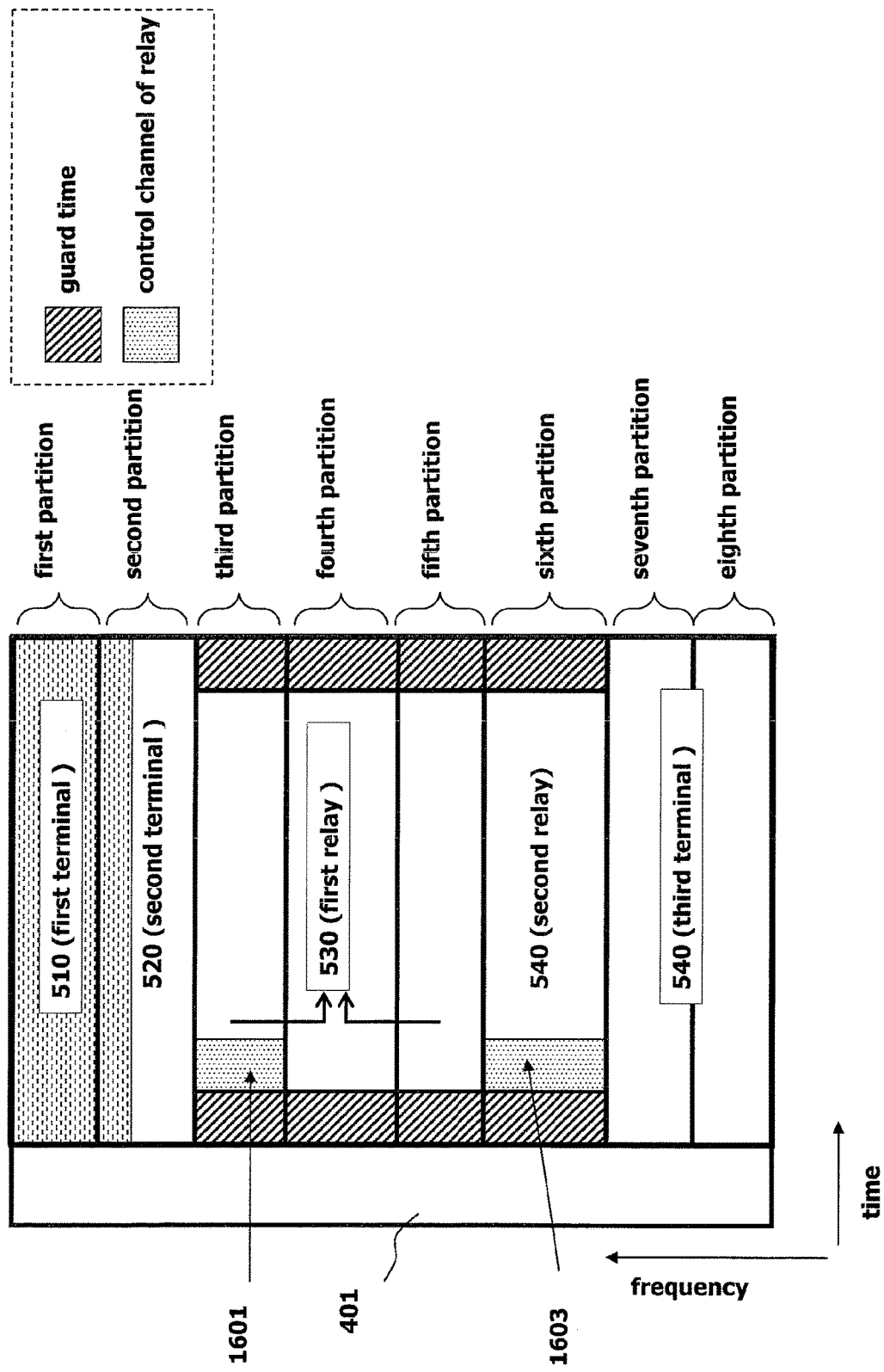
FIG. 16 is a view illustrating an embodiment in which backhaul data of a specific relay is allocated with respect to one partition.

FIG. 16 is a view illustrating an embodiment in which backhaul data of a specific relay is allocated with respect to one partition.

As shown, a backhaul channel of a specific relay is allocated as a specific partition used for transmission of backhaul data. Accordingly, scheduling is performed so that backhaul data of one relay can be allocated to a specific partition. In this case, resource waste may occur due to the limitation that data of one relay is allocated to one partition. Therefore, it is preferable to properly control a size of resources occupied by each partition. For instance, in a 3GPP LTE system, a size of the partition may be controlled as a unit of three resource blocks. In a case where one relay is allocated with a plurality of frequency resources, overhead of a control channel may be increased in proportional to a size of allocated resources. In order to prevent this problem, resources of another partition may be scheduled through a control channel of one partition.

As shown in FIG. 16, in this embodiment, the entire frequency resources are divided into eight partitions having a fixed size, i.e., a smaller size of frequency resources than that of the aforementioned embodiment. And, each partition may be allocated as a data channel of a terminal (macro UE) or a backhaul link channel of a relay. Frequency domain resources of a data channel allocated to one terminal may be allocated to a frequency resource domain larger than one partition.

As shown, a data channel 510 of a first terminal is allocated as some frequency resources of first and second partitions, a data channel 520 of a second terminal is allocated as the rest resources of the second partition, and a data channel 540 of a third terminal is allocated as resources of seventh and eighth partitions.

The rest partitions are allocated as a backhaul channel of the relay, and a first relay may be allocated with resources by allocating third to fifth partitions as its backhaul data channel, through a control channel 1601 which exists in a third partition. In some cases, a control channel 1603 and a backhaul data (540) channel may be allocated with resources through one partition such as a second relay.

This embodiment is similar to the aforementioned embodiment explained with reference to FIG. 15 in the aspect of results of resource allocation, but is different in that control channels 1601 and 1603 of the relays always occupy the entire frequency domain of one partition. This may result in an advantage to lower complexity when implementing the relays in that a location of resources is fixed, the resources to be searched so as to blind-decode control information included in a control channel by each relay.

Figure 17:
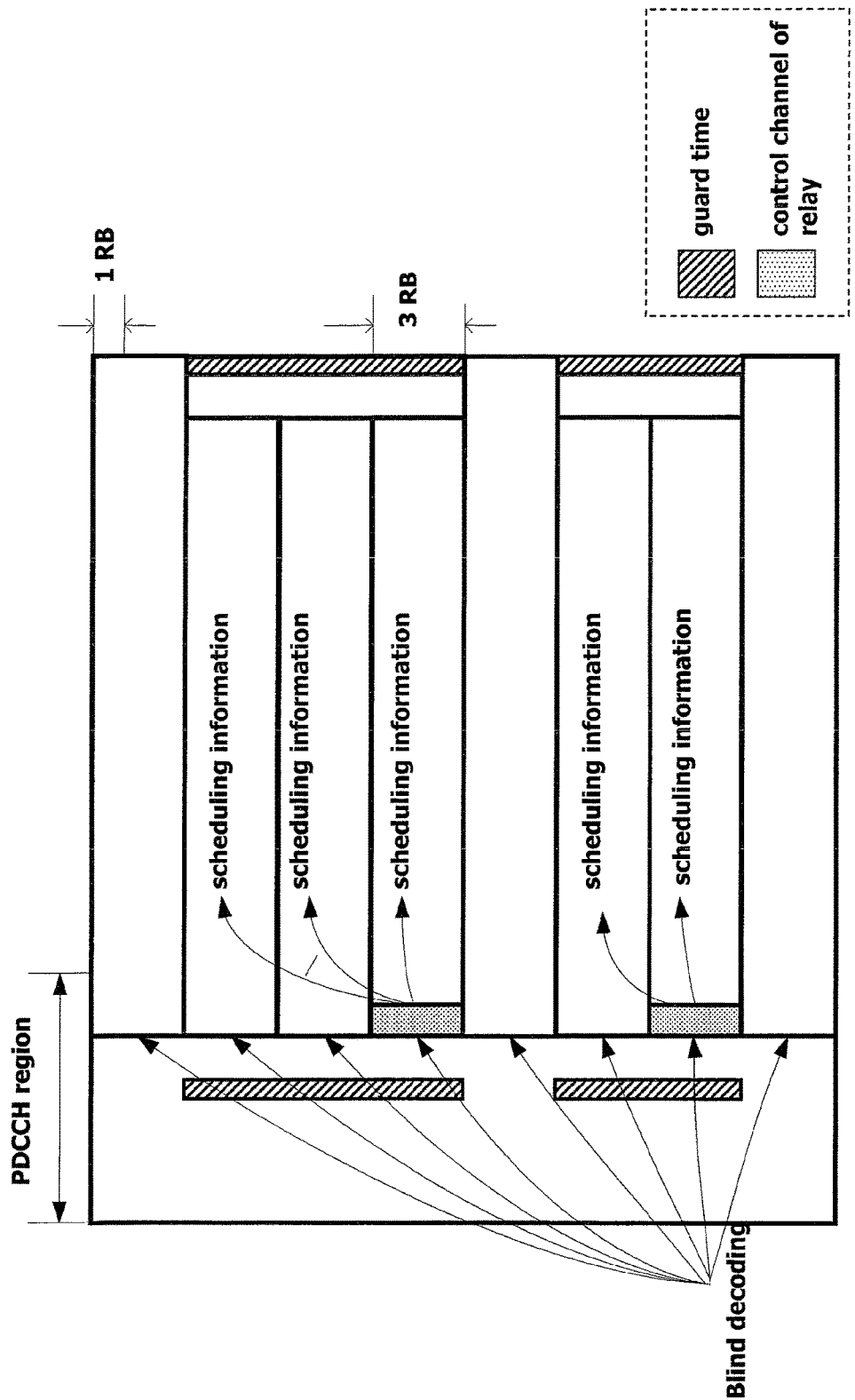
FIGS. 17 to 19 are views illustrating modified embodiments of an embodiment explained with reference to FIG. 16.
Figure 18:
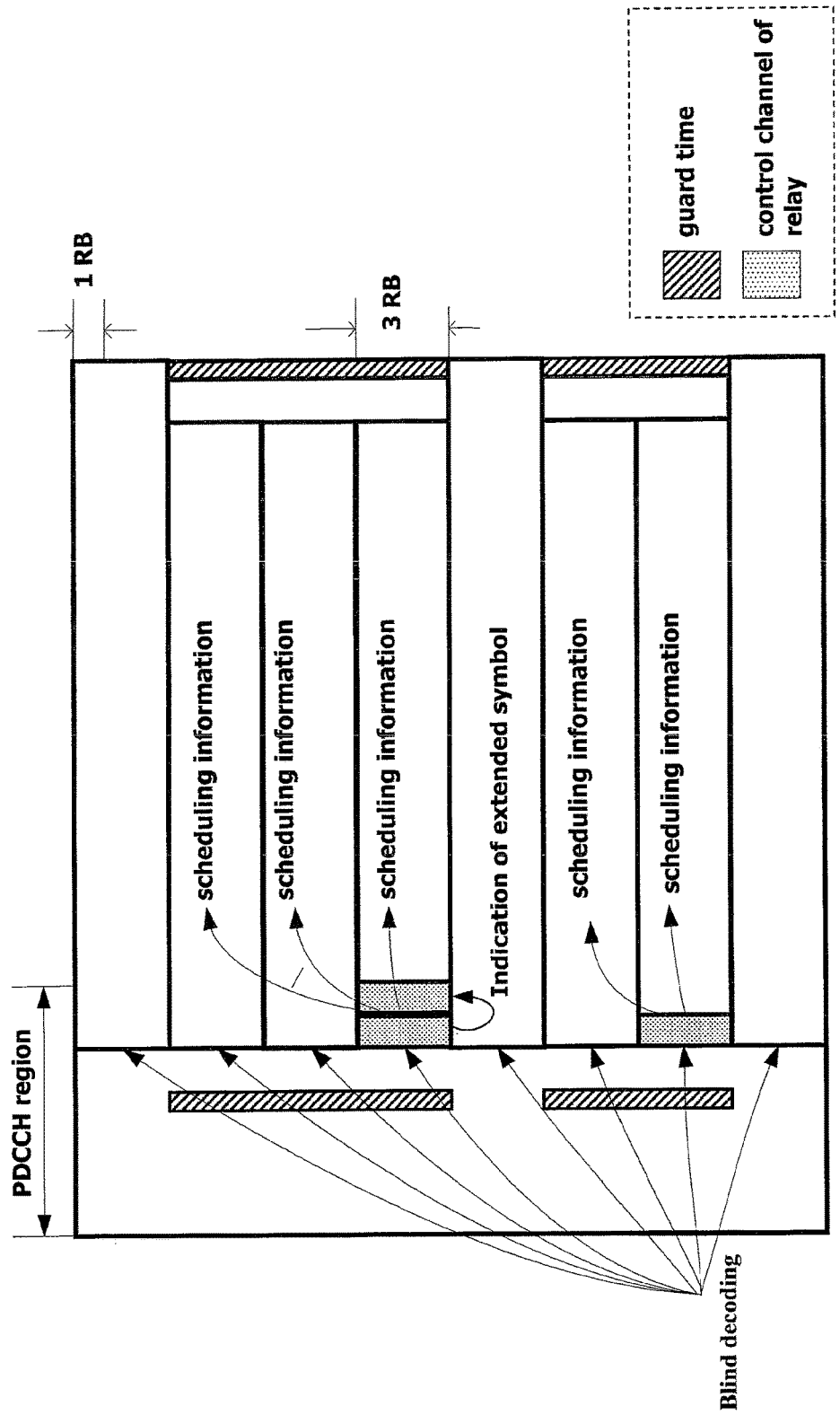
Figure 19:
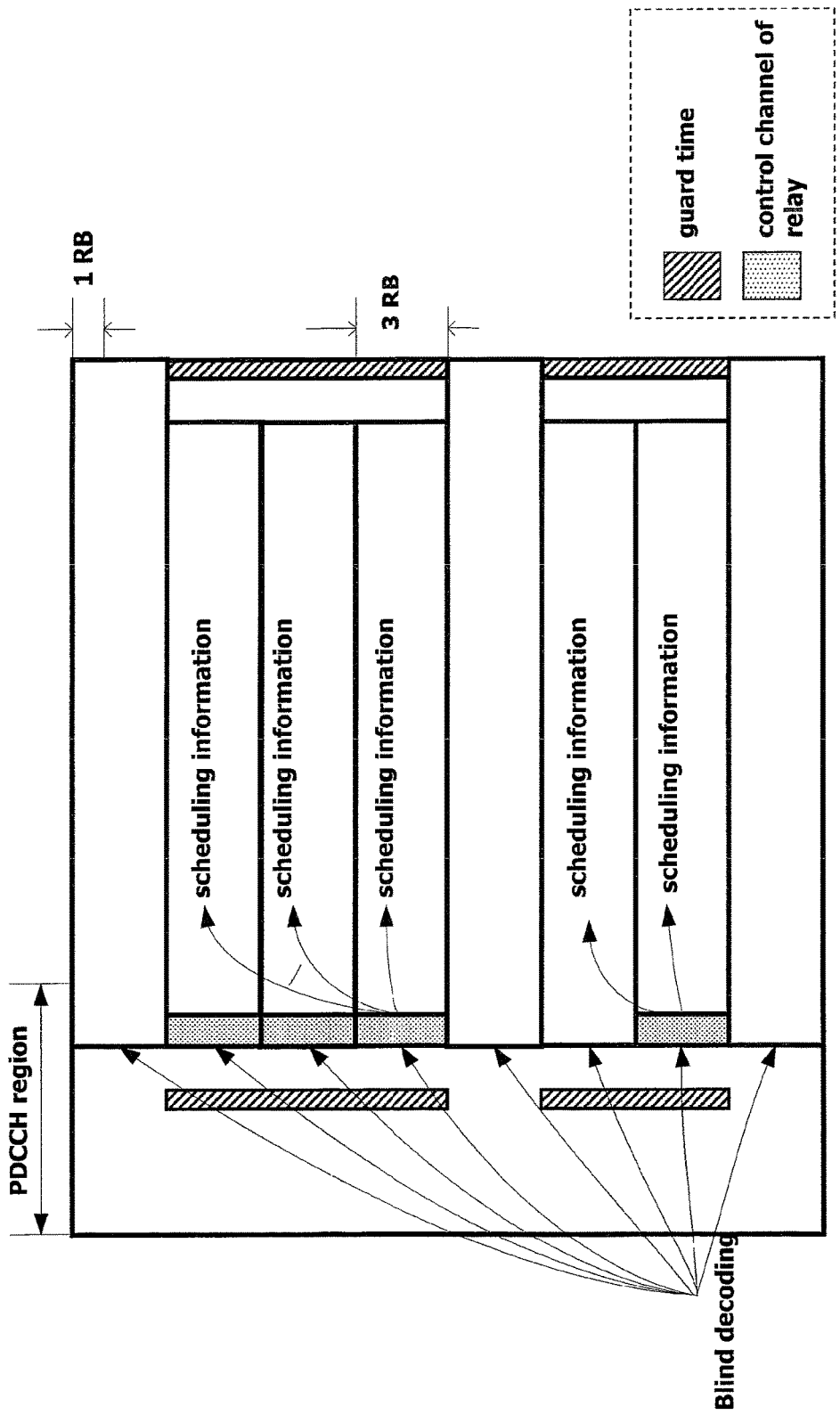

FIGS. 17 to 19 are views illustrating modified embodiments of the embodiment explained with reference to FIG. 16.

In FIGS. 17 to 19, it is assumed that a partition unit of a backhaul link channel, or an allocation unit of a data channel is 3RB. However, this is merely exemplary. If a control channel element (CCE) suitable for a relay control channel (R-PDCCH) is determined, the CCE or an integer multiple of the CCE are preferably used.

Preferably, the R-PDCCH allocated to one relay is transmitted with a fixed size rather than a variable size. In some cases, the R-PDCCH may be transmitted over plural OFDM symbols.

The base station may configure, via a higher layer signal, the number of OFDM symbols occupied by the R-PDCCH with respect to each relay. This R-PDCCH has a capability to schedule a data channel (R-PDSCH) allocated to a corresponding relay. In FIG. 17, a data channel (R-PDSCH) toward a corresponding relay which exists in another partition is scheduled through an R-PDCCH which exists in one partition.

In FIG. 18, a first R-PDCCH is designed to indicate a following additional R-PDCCH. For instance, in an assumption that a first OFDM symbol of the R-PDCCH is downlink scheduling information, whether uplink scheduling information exists in a subsequent OFDM symbol may be indicated through an indicator bit included in the first symbol. Here, the two symbols (downlink scheduling information and uplink scheduling information) may not be necessarily located in a consecutive manner. For convenient design of the R-PDCCH, the number of R-PDCCH symbols (N symbols, N=1, 2, 3, . . . , N_max) of all the relays may be fixed.

As shown in FIG. 19, it is possible to transmit the R-PDCCH by designing in all partition units or allocation units. This scheme may be applied to a case where a channel coding, an MCS establishment, etc. are independently performed since the R-PDSCH which exists in each partition corresponds to a different transport block. As a combination of the schemes shown in FIGS. 17 and 18, when one relay receives the R-PDSCH through N partitions, the R-PDCCH which performs a scheduling may be set to exist in partitions having the number of 'M' equal to or smaller than the 'N' (M=1, 2, 3, . . . , N). Here, the 'M' may be set to be the number of transport blocks to be transmitted to a corresponding relay, or the number of codewords.

Figure 20:
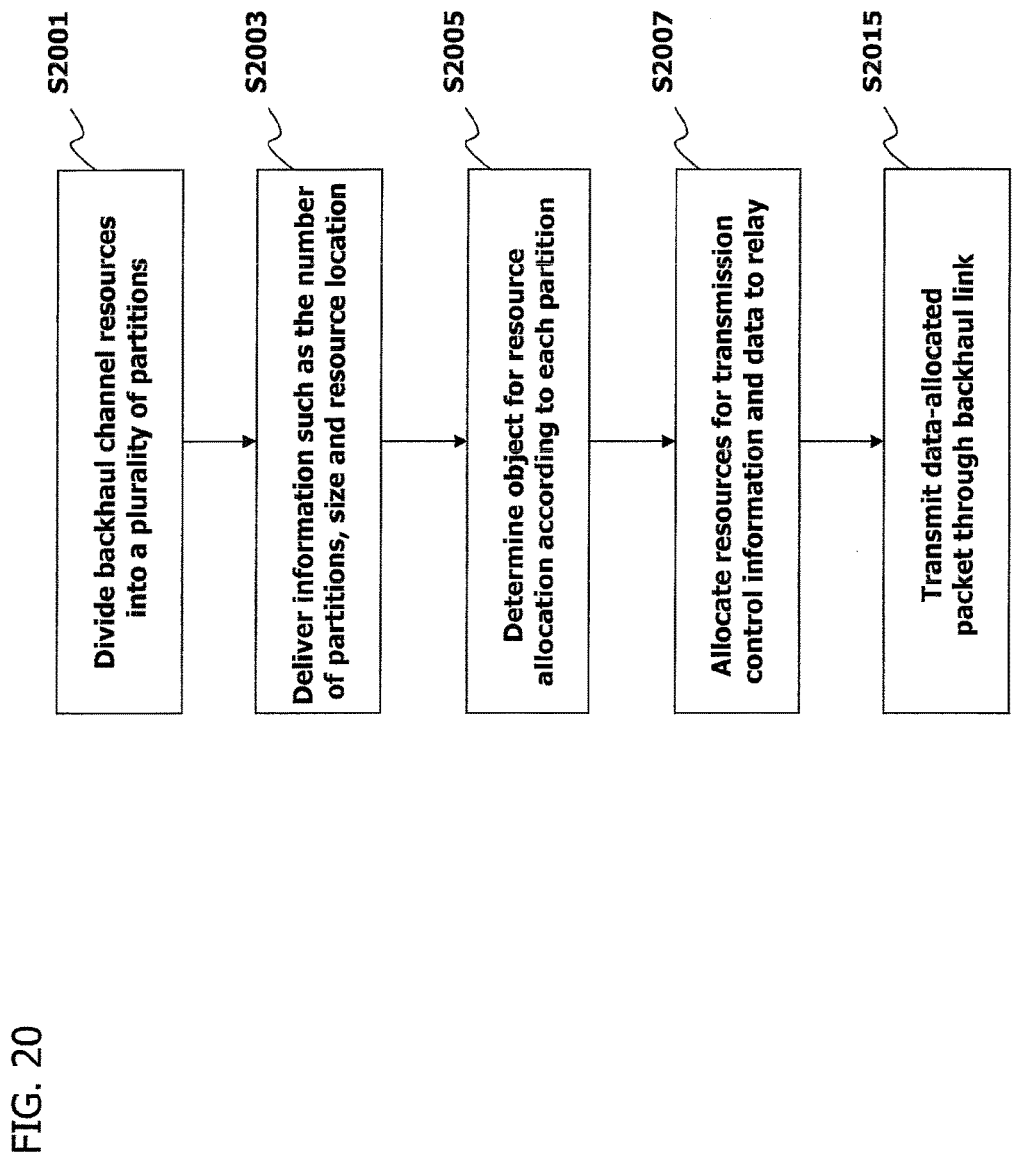
FIG. 20 is a flowchart sequentially illustrating a method for allocating backhaul channel resources and transmitting data by a base station according to a first embodiment of the present invention.

FIG. 20 is a flowchart sequentially illustrating a method for allocating backhaul channel resources and transmitting data by a base station according to a first embodiment of the present invention.

As shown, the base station divides radio resources after an OFDM symbol period 401 into two or more partitions in a frequency domain, the radio resources transmitted through a PDCCH for transmitting control information of the terminal directly connected to the base station through a link (S2001).

The base station transmits information to the relay via a higher layer control signal, the information including the total number of divided partitions, a size of each partition and a location of resources occupied by each partition (S2003).

Then, the base station determines whether to allocate each partition to the terminal directly connected thereto through a link, or to a backhaul link for the relay when performing a downlink scheduling of a corresponding sub-frame (S2005).

To a partition allocated for the terminal, data (PDSCH) transmitted to the terminal is transmitted like in the conventional art. And, scheduling information is included in the PDCCH 401 transmitted to the terminal. Therefore, when one partition is used for transmission to the terminal, two or more data channels (PDSCH) may exist in one partition.

To a partition allocated as a backhaul link to the relay, have to be transmitted a data channel (R-PDSCH) transmitted to the relay, and a control channel (R-PDCCH) to which scheduling information is transmitted. Here, the backhaul link partition determined for allocation resources to the relay may be transmitted to the relay through time division multiplexing (TDM) or frequency division multiplexing (FDM) of both control and data channels of the relay.

Then, data is allocated to the corresponding resources with respect to a partition allocated as a channel for data transmission to the terminal, and a partition allocated as a channel for transmission of control information and data to the relay (S2007).

Then, a data-allocated packet is transmitted through a backhaul link channel (S2015).

Figure 21:
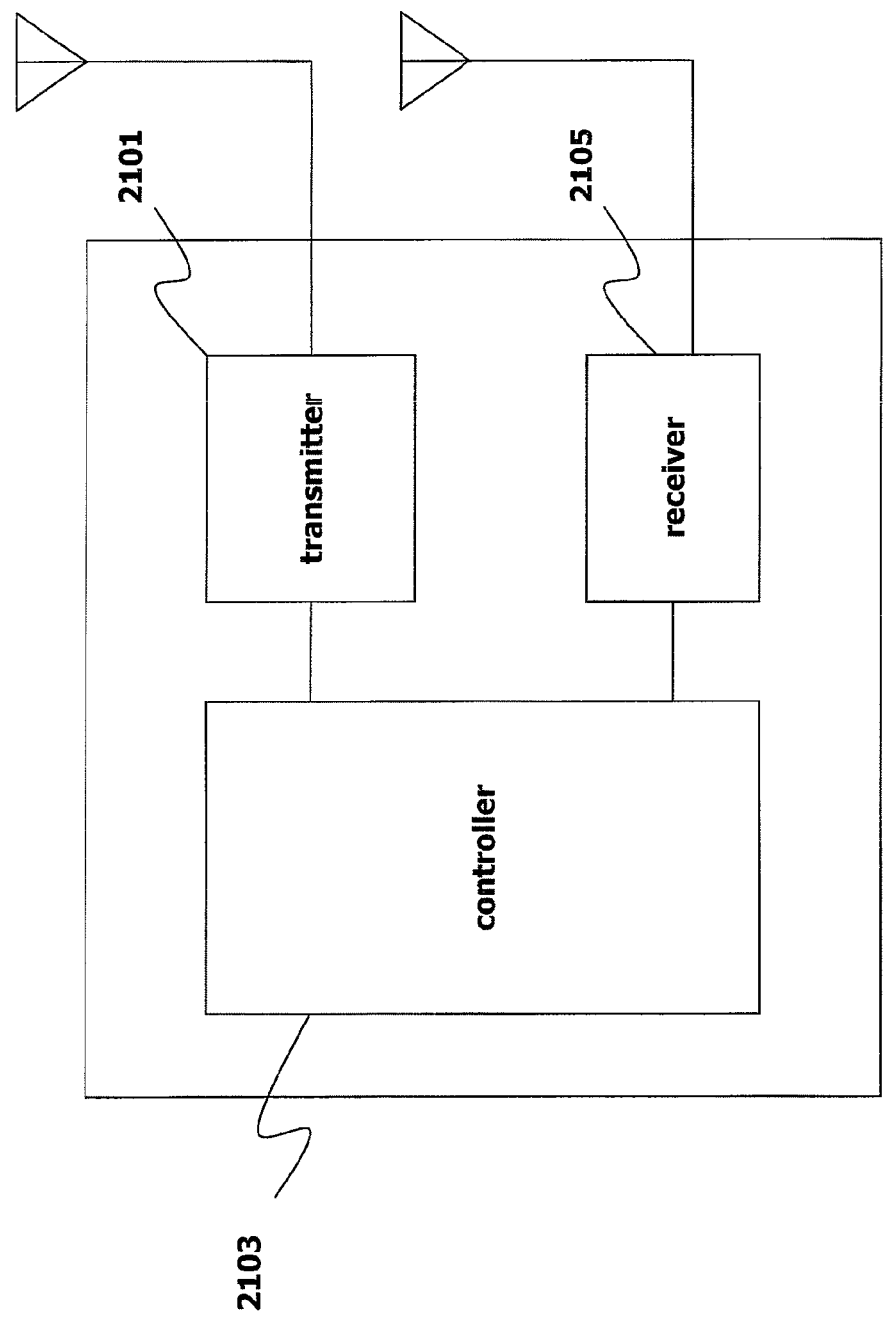
FIG. 21 is a block diagram schematically illustrating a configuration of a base station according to a first embodiment of the present invention.

FIG. 21 is a block diagram schematically illustrating a configuration of a base station according to a first embodiment of the present invention.

The base station comprises a transmitter 2101, a controller 2103 and a receiver 2105.

The controller 2103 divides downlink resources into two or more partitions in a frequency domain, and determines whether to allocate resources to the relay or the terminal with respect to each of the divided partitions.

The transmitter 2101 allocates data to the determined partition, and transmits the data to the relay or the terminal through the downlink channel.

The partition determined for allocation of resources to the relay is transmitted to the relay through time division multiplexing (TDM) or frequency division multiplexing (FDM) of both control and data channels of the relay. Here, the resource allocation through the control and data channels of the relay may be implemented through the aforementioned various embodiments.

Figure 22:
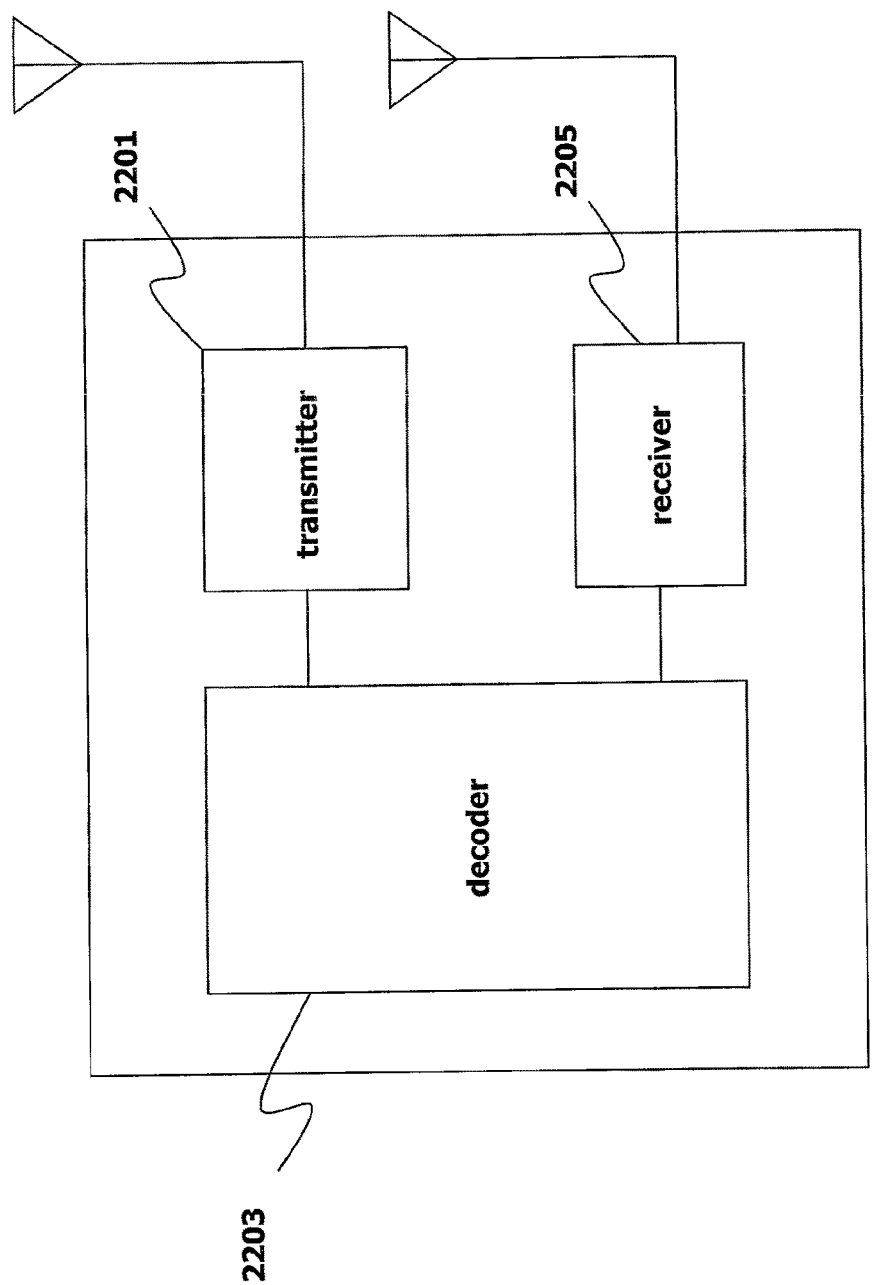
FIG. 22 is a block diagram schematically illustrating a configuration of a relay according to a first embodiment of the present invention.

FIG. 22 is a block diagram schematically illustrating a configuration of a relay according to a first embodiment of the present invention.

The relay comprises a transmitter 2201, a decoder 2203 and a receiver 2205.

The receiver 2205 receives data transmitted from a base station through a backhaul link channel.

The decoder 2203 blind-decodes receives data in a predetermined frequency domain, thus to search scheduling information on its backhaul data. If the decoder 2203 succeeds in decoding a control channel at a specific location in a frequency domain, the decoder 2203 recognizes that data has been allocated to frequency resources occupied by the control channel, and then decodes backhaul data.

In addition, the above various embodiments may be implemented by using, computer software, hardware, or some combination thereof. For instance, the method of the present invention may be stored in a storage medium (e.g., internal memory, flash memory, hard disc, etc.), or may be implemented in codes or commands inside a software program that can be executed by a processor such as a microprocessor inside a UE.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

What is claimed is:

1. A method for monitoring a plurality of downlink control channels by a User Equipment (UE) in a wireless communication system, the method comprising:
   monitoring a physical resource block (PRB) set in a subframe to detect the plurality of downlink control channels,
   wherein the PRB set is indicated by higher layer signaling; and decoding a Physical Downlink Shared CHannel (PDSCH) on the subframe excluding resource elements used for the plurality of downlink control channels, wherein the PRB set includes at least two of a plurality of partitions divided in a frequency domain, and the plurality of downlink control channels are distributed within the at least two partitions included in the PRB set.

2. The method of claim 1, wherein the plurality of partitions correspond to PRBs.

3. The method of claim 1, wherein the plurality of downlink control channels are transmitted through all Orthogonal Frequency Division Multiplexing (OFDM) symbol periods of a specific partition of the plurality of partitions.

4. The method of claim 1, wherein each of the plurality of downlink control channels includes information of resource assignment and information of modulation and coding scheme (MCS).

5. The method of claim 1, wherein a number of resource regions for a specific partition of the plurality of partitions is restricted to be configured as a multiple of a predetermined value.

6. A User Equipment (UE) for monitoring a plurality of downlink control channels in a wireless communication system, the UE comprising:
a transceiver; and
a processor operably coupled with the transceiver,
wherein the processor is configured to:
monitor a physical resource block (PRB) set in a subframe to detect the plurality of downlink control channels,
wherein the PRB set is indicated by higher layer signaling, and
decode a Physical Downlink Shared CHannel (PDSCH) on the subframe excluding resource elements used for the plurality of downlink control channels,
wherein the PRB set includes at least two of a plurality of partitions divided in a frequency domain, and the plurality of downlink control channels are distributed within the at least two partitions included in the PRB set.

* * * * *